United States Patent
Maze et al.

(10) Patent No.: US 10,862,943 B2
(45) Date of Patent: Dec. 8, 2020

(54) METHODS, DEVICES, AND COMPUTER PROGRAMS FOR IMPROVING STREAMING OF PARTITIONED TIMED MEDIA DATA

(71) Applicant: CANON KABUSHIKI KAISHA, Tokyo (JP)

(72) Inventors: Frédéric Maze, Langan (FR); Franck Denoual, Saint Domineuc (FR); Cyril Concolato, Combs la Ville (FR); Jean Le Feuvre, Cachan (FR)

(73) Assignee: Canon Kabushiki Kaisha, Tokyo (JP)

(*) Notice: Subject to any disclaimer, the term of this patent is extended or adjusted under 35 U.S.C. 154(b) by 686 days.

(21) Appl. No.: 15/128,721

(22) PCT Filed: Mar. 24, 2015

(86) PCT No.: PCT/EP2015/056317
§ 371 (c)(1),
(2) Date: Sep. 23, 2016

(87) PCT Pub. No.: WO2015/144735
PCT Pub. Date: Oct. 1, 2015

(65) Prior Publication Data
US 2017/0223083 A1  Aug. 3, 2017

(30) Foreign Application Priority Data
Mar. 25, 2014  (GB) .................. 1405365.6

(51) Int. Cl.
*H04L 29/06* (2006.01)
*H04N 21/2343* (2011.01)
(Continued)

(52) U.S. Cl.
CPC ... *H04L 65/608* (2013.01); *H04N 21/234327* (2013.01); *H04N 21/234345* (2013.01);
(Continued)

(58) Field of Classification Search
None
See application file for complete search history.

(56) References Cited

U.S. PATENT DOCUMENTS

| 2012/0013746 A1* | 1/2012 | Chen | G11B 27/034 |
| | | | 348/180 |
| 2012/0102042 A1* | 4/2012 | Flick | G06F 16/41 |
| | | | 707/746 |

(Continued)

FOREIGN PATENT DOCUMENTS

| JP | 2009522984 A | 6/2009 |
| WO | 2013/036451 A1 | 3/2013 |
| WO | 2014/010444 A1 | 1/2014 |

OTHER PUBLICATIONS

Frédéric Maze, et al., "Report on the Spatial Relationship Description Core Experiment",106th, MPEG Meeting, Oct. 28, 2013-Jan. 11, 2013, Geneva,(Motion Picture Expert Group or ISO/I EC JTC1/SC29/WG11), No. m31603, Oct. 28, 2013 (Oct. 28, 2013). XP030060055, Section 2 Summary of discussions on the DASH reflector, Section 4. Examples, Section 5. Optional additional prameters.

(Continued)

Primary Examiner — Alexander Q Huerta
(74) Attorney, Agent, or Firm — Canon U.S.A., Inc. IP Division

(57) ABSTRACT

Receiving, transmitting, and generating streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated component. A manifest comprises a dependency item of information indicating a dependency relation between components and a dependency characterization item of information for interpreting (Continued)

the dependency item of information. Alternatively, the manifest comprises at least two different descriptions of at least one component, a first description comprising at least a first dependency item of information indicating a dependency relation from the at least one component to another component and a second description comprising at least a second dependency item of information indicating a dependency relation from another component to the at least one component.

31 Claims, 15 Drawing Sheets

(51) Int. Cl.
- *H04N 21/4402* (2011.01)
- *H04N 21/4728* (2011.01)
- *H04N 21/845* (2011.01)
- *H04N 21/643* (2011.01)
- *H04N 21/854* (2011.01)

(52) U.S. Cl.
CPC ........... *H04N 21/440227* (2013.01); *H04N 21/440245* (2013.01); *H04N 21/4728* (2013.01); *H04N 21/64322* (2013.01); *H04N 21/8456* (2013.01); *H04N 21/85406* (2013.01)

(56) References Cited

U.S. PATENT DOCUMENTS

| | | | |
|---|---|---|---|
| 2012/0259994 A1* | 10/2012 | Gillies | H04L 12/1881 709/231 |
| 2013/0060911 A1 | 3/2013 | Nagaraj et al. | |
| 2013/0097334 A1* | 4/2013 | Wu | H04N 21/26258 709/231 |
| 2013/0191511 A1 | 7/2013 | Liu et al. | |
| 2014/0079116 A1* | 3/2014 | Wang | H04N 19/46 375/240.02 |
| 2014/0082054 A1 | 3/2014 | Denoual et al. | |
| 2014/0089990 A1* | 3/2014 | van Deventer | H04N 21/218 725/61 |
| 2015/0026358 A1* | 1/2015 | Zhang | H04L 65/601 709/231 |
| 2015/0089074 A1* | 3/2015 | Oyman | H04N 21/23439 709/231 |
| 2015/0120819 A1* | 4/2015 | Zhang | H04L 65/602 709/203 |
| 2016/0260141 A1* | 9/2016 | Zhang | H04N 21/2541 |
| 2018/0041610 A1* | 2/2018 | Denoual | H04L 65/602 |
| 2018/0109581 A1* | 4/2018 | Thang | H04N 21/84 |
| 2018/0242028 A1* | 8/2018 | Van Brandenburg | H04N 21/26258 |
| 2019/0141359 A1* | 5/2019 | Taquet | H04N 21/21805 |

OTHER PUBLICATIONS

Concolato, et al., "Usage of DASH SRD for HEVC Tiling",108th MPEG Meeting, Mar. 31, 2014-Apr. 4, 2014, Valencia, (Motion Picture Expert Group or ISO/IEC JTC1/SC29/WG11), No. m33210, Mar. 26, 2014 (Mar. 26, 2014), XP030061662, the whole document.

Concolato, et al., "Dependency type signaling in DASH", 108th MPEG Meeting, Mar. 31, 2014-Apr. 4, 2014, Valencia, (Motion Picture Expert Group or ISO/IEC JTC1/SC29/WG11), No. m33211, Mar. 26, 2014 (Mar. 26, 2014), XP030061663, the whole document.

Hirabayashi, et al., "Additional parameters proposal on CE SRD", 107th MPEG Meeting; Jan. 13, 2014-Jan. 17, 2014; San Jose; (Motion Picture Expert Group or ISO/IEC JTC1/WG11), No. m32202, Jan. 8, 2014 (Jan. 8, 2014), XP030060654, the whole document.

Le Feuvre, et al., "TuC on ordered combination of separate tracks and HEVC tile tracks", 106th MPEG Meeting, Oct. 28, 2013-Nov. 1, 2013, Geneva, (Motion Picture Expert Group or ISO/IEC JTC1/SC29/WG11), No. NI3956, Nov. 1, 2013 (Nov. 1, 2013), XP030020698, the whole document.

Thomas, et al., "Spatially segmented content description", 104th MPEG Meeting, Apr. 22, 2013-Apr. 26, 2013, Incheon, (Motion Picture Expert Group or ISO/IEC JTC1/SC29/WG11), No. m28883, Apr. 12, 2013 (Apr. 12, 2013), XP030057416, the whole document.

* cited by examiner

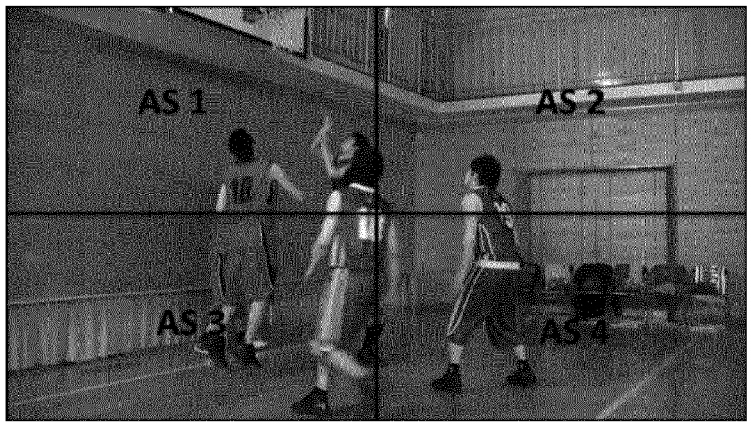

```
<?xml version="1.0" encoding="UTF-8"?>
<MPD ...]>
 <Period ... >    <!-- 4 tiles -->
   <!-- Tile AS1 -->
   <AdaptationSet [...]>
      <SupplementalProperty schemeIdUri="urn:mpeg:dash:srd:2014" value="1, 0, 0, 100, 100, 200, 200"/>
      <Representation id="1" bandwidth="5000000" width="1920" height="1080">
        <BaseURL>tile1.mp4</BaseURL>
      </Representation>
   </AdaptationSet>
   <!-- Tile AS2 -->
   <AdaptationSet [...]>
     <EssentialProperty
    schemeIdUri="urn:mpeg:dash:srd:2014" value="1, 100, 0, 100, 100"/>
     <Representation id="2" bandwidth="5000000" width="1920" height="1080">
        <BaseURL>tile2.mp4</BaseURL>
      </Representation>
   </AdaptationSet>
   <!-- Tile AS3 --> ...
   <!-- Tile AS4 -->  ...
 </Period>
</MPD>
```

Fig. 4b

METHODS, DEVICES, AND COMPUTER PROGRAMS FOR IMPROVING STREAMING OF PARTITIONED TIMED MEDIA DATA

CROSS-REFERENCE TO RELATED APPLICATIONS

The application is the National Phase application of PCT Application No. PCT/EP2015/056317, filed on Mar. 24, 2015 and which claims the benefit under 35 U.S.C. § 119(a)-(d) of United Kingdom Patent Application No. GB1405365.6, filed on Mar. 25, 2014. The above cited patent applications are incorporated herein by reference in their entirety.

FIELD OF THE INVENTION

The invention generally relates to the field of timed media data streaming over communication networks, for example communication networks conforming to Internet Protocol (IP) standard. More particularly, the invention concerns methods, devices, and computer programs for improving streaming of partitioned timed media data, in particular streaming of tiled timed media data over IP networks using the HyperText Transfer Protocol (HTTP).

BACKGROUND OF THE INVENTION

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code. To be transmitted, a video bit-stream is generally encapsulated according to a transmission protocol that typically adds headers and check bits.

Streaming media data over a communication network typically means that the data representing a media presentation are provided by a host computer, referred to as a server, to a playback device, referred to as a client device, over the communication network. The client device is generally a media playback computer implemented as any of a variety of conventional computing devices, such as a desktop Personal Computer (PC), a tablet PC, a notebook or portable computer, a cellular telephone, a wireless handheld device, a personal digital assistant (PDA), a gaming console, etc. The client device typically renders a streamed content as it is received from the host (rather than waiting for an entire file to be delivered).

A media presentation generally comprises several media components such as audio, video, text, and/or subtitles that can be sent from a server to a client device for being jointly played by the client device. Those media components are typically encoded individually into separate media streams and next, they are encapsulated into multiple media segments, either together or individually, and sent from a server to a client device for being jointly played by the latter.

A common practice aims at giving access to several versions of the same media component so that the client device can select one version as a function of its characteristics (e.g. resolution, computing power, and bandwidth). According to the existing proprietary solutions each of the alternative versions is described and media data are segmented into small temporal segments.

In the context of the dynamic and adaptive streaming over HTTP, a new standard called DASH (Dynamic Adaptive Streaming over HTTP) has recently emerged from the MPEG standardization committee ("ISO/IEC 23009-1, Dynamic adaptive streaming over HTTP (DASH), Part1: Media presentation description and segment formats"). This standard enables association of a compact description of the media content of a media presentation with HTTP Uniform Resource Locations (URLs). Such an association is typically described in a file called a manifest file or a description file. In the context of DASH, this manifest file is an XML file also called the MPD file (Media Presentation Description).

By receiving an MPD file, a client device gets the description of each media content component. Accordingly, it is aware of the kind of media content components proposed in the media presentation and knows the HTTP URLs to be used for downloading the associated media segments. Therefore, the client device can decide which media content components to download (via HTTP requests) and to play (i.e. to decode and to play after reception of the media segments).

In addition to such an association, the DASH standard proposes to split each media content as a function of periods of time. The time decomposition is described in the MPD file. Accordingly, the latter defines the association between HTTP URLs and the compact description of each component from media content over each period of time. Each media content component can be encapsulated into multiple independent media segments corresponding to these periods of time.

This standard allows a client to download desired media content components of a media presentation over desired periods of time.

The encapsulation file format used for streaming media content components within media segments in MPEG DASH may conform the ISO Base Media File Format defined in the context of the MPEG standardization activity. In particular, the encapsulation file format may relate to the standardization of the encapsulation of the High Efficiency Video Coding (HEVC) and its scalable extension in the ISO Base Media File Format (ISO/IEC 14496 Part 15), especially when using HEVC tiles for Regions-of-Interest (ROIs) and more generally for spatial access in compressed videos.

It is to be noted that extraction/streaming and displaying of regions of interest relying on tile composition is particularly useful for enabling interactive high quality zoom-in functions during streaming, for example by allowing a user to click on specific areas in video sequences to give access to a higher resolution video for the specific selected areas.

It is to be recalled that video resolution continuously increases, going from standard definition (SD) to high definition (HD), and to ultra-high definition (e.g. 4K2K or 8K4K). Video sequences can be encoded using either a single-layer (e.g. HEVC) or a multi-layer (e.g. Scalable HEVC) coding standard. In case of multi-layer coding format, a given layer can be used as reference data for one or more other layers. The layered video organization can be efficiently represented using multiple dependent media content components, each component representing a video layer at a different level of scalability. In order to decode a given media content component, a client device must have access to the media content component itself but also to all media content components it depends on.

It is also to be recalled that there is a proliferation of mobile and connected devices with video streaming capabilities. Accordingly, splitting the video sequences into tiles becomes important if a user of a mobile device wants to display or to focus on sub-parts of a video sequence by keeping or even improving the quality. By using tiles, a user can therefore interactively request spatial sub-parts of the video sequence. In case of scalable video coding format (e.g. scalable HEVC or multi-view HEVC), each video layer can be organized into multiple independent spatial sub-parts except that coding dependencies may exist between tiles of an enhancement layer and one or more tiles of a base layer.

US Patent Application US 2010/0299630 discloses a system for the viewing of regions of interest in panoramic images. To that end, the regions of interest are pre-generated at the server end or cropped from the full-video in the client device.

In the article entitled "An interactive region-of-interest video streaming system for online lecture viewing" published in Packet Video conference 2010, the authors mention the use of tiles for streaming or regions of interest. They also use a manifest to provide identifier and location information of the tiles (actually H.264 slices). Because a URL is not provided for each tile, the described solution requires some intelligence at the server end to interpret specific HTTP queries sent from the client device to stream the selected tiles.

International Patent Application WO 2012168365 discloses a spatial manifest file that describes one or more spatial segment streams with their location information (URL). Users have the possibility to select one or more spatial areas. The manifest file describes relationships between the spatial segments. A synchronization engine is need in the client device for streaming and displaying more than one tile at a time (the tile tracks being not individually encapsulated).

For efficient streaming and fast spatial and temporal access to spatial sub-parts of the video, the ISO Base Media File Format proposes to store independently decodable HEVC tiles in different tracks (or media content components). An additional specific track (called "layer track reference", "composite track" or "base track") can be defined to contain all data common to all tile tracks (e.g. VPS, SPS or PPS NAL units) and to reconstruct the complete video by referencing each tile track it depends on.

In the context of DASH, the ISO BMFF standard is used to encapsulate media contents into media data segments in order to form a media presentation. A possible way to describe tiles according to ISO BMFF is to encapsulate each sub-part of a video sequence (i.e. the tiles) into a different track and to use the track's deformation matrix to signal tile positions. Generally, using DASH, each track is described in the manifest as independent media content. The manifest is not designed to signal that each track is a sub-part of the same video sequence. Therefore, the current MPD definition doesn't allow tiled video to be described.

In practice, a user would have to download a first initialization segment (in addition to the manifest) for determining that each video sequences described in a MPD is a sub-part of a tiled video sequence (via track and matrix definitions in boxes known as moov/track/tkhd). Next, the user would have to download, at the minimum, the beginning of each first media data segment of each video content to retrieve the association between tile locations and video content (via the boxes known as moof/traf/tfhd). The downloading of this initialization information leads to delays and additional HTTP roundtrips.

To solve these issues, all the media content components having various dependency relationships are described in a compact manner in the manifest. In such a way, the association between spatial video sub-parts and HTTP URLs can be established and the downloading of the video sub-parts is carried out optimally with respect to all existing dependencies. In other words, there is a need to express precisely the dependencies between the different adaptation sets/representations in the manifest and to indicate to streaming clients what must to be downloaded and what could be optionally downloaded when selecting a video representation.

SUMMARY OF THE INVENTION

Faced with these constraints, the inventors provide a device for streaming partitioned timed media data.

It is a broad object of the invention to remedy the shortcomings of the prior art as described above.

According to a first aspect of the invention there is provided a method for receiving streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated component, the method comprising:

receiving a manifest comprising a description of the components;

selecting at least one component to reconstruct at least a portion of the partitioned timed media data;

obtaining from the manifest a dependency item of information indicating a dependency relation between the selected component and at least one other component;

obtaining from the manifest a dependency characterization item of information for interpreting the dependency item of information;

requesting the selected component and the at least one other component depending on the value of the dependency item of information in view of the dependency characterization item of information; and on reception of the requested components, reconstructing the corresponding portion of the partitioned timed media data from the received components and generating a playable media representation bit-stream.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

In an embodiment, the at least one other component is requested depending on the value of the dependency item of information in view of the dependency characterization item of information and as a function of a user's choice.

In an embodiment, the streamed timed media data is further organized into scalability layers, each layer being organized into temporal media segments.

In an embodiment, the dependency characterization item of information is indicative of a sub-stream conforming to the HEVC standard or of a sub-stream representing a spatial portion of the partitioned timed media data.

In an embodiment, the dependency characterization item of information is indicative of the type of the component the considered component depends on.

In an embodiment, the dependency characterization item of information is an attribute (also called element or descriptor) associated with the dependency item of information which indicates if the selected component corresponds to a subsample, a plurality of subsamples, or a sample.

In an embodiment, the selected component depends on another component which is representative of a sample comprising a subsample or a plurality of subsamples if the dependency characterization item of information indicates that the selected component corresponds to that subsample or that plurality of subsamples.

In an embodiment, first spatial information associated with the selected component is obtained from the manifest, the other component having other spatial information related to the first spatial information.

In an embodiment, the dependency characterization item of information further indicates which layer the encapsulated component belongs to.

In an embodiment, the dependency item of information is the "dependencyId" attribute and the dependency characterization item of information is the "@codec" attribute.

In an embodiment, the dependency characterization item of information is indicative of the type of dependency for the considered component.

In an embodiment, the dependency characterization item of information in the manifest refers to a type value of a set of different values, generated during a step of encapsulating the components.

Preferably, the set of different values corresponds to track reference type defined in ISOBMFF.

In an embodiment, the dependency characterization item of information is an attribute (also called element or descriptor).

In an embodiment, the set of type values comprises:

a first type value which indicates that the selection of the other component is mandatory to reconstruct the corresponding portion of the partitioned times media data, and/or a second type value which indicates that the selection of the other component is optional to reconstruct the corresponding portion of the partitioned times media data.

In an embodiment, the data structures and the data structure parameters of the manifest comply with DASH standard.

According to a second aspect of the invention there is provided a method for receiving streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated component, the method comprising:

receiving a manifest comprising a description of the components, the manifest comprising at least two different descriptions of at least one component, a first of the at least two descriptions comprising at least a first dependency item of information indicating a dependency relation from the at least one component to another component and a second of the at least two descriptions comprising at least a second dependency item of information indicating a dependency relation from another component to the at least one component;

selecting at least one component to reconstruct at least a portion of the partitioned timed media data;

identifying one component needed to reconstruct the selected component, the component needed to reconstruct the selected component being identified as a function of the first dependency item of information of a description associated with the selected component or being identified as a function of the second dependency item of information of a description associated with that component;

requesting the selected and the identified component; and on reception of the requested components, reconstructing the corresponding portion of the partitioned timed media data from the received components and generating a playable media representation bit-stream.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

In an embodiment, the two different descriptions correspond to a component which is representative of a sample comprising at least two subsamples.

In an embodiment, the streamed timed media data is further organized into scalability layers, each layer being organized into temporal media segments.

In an embodiment, a component that can be selected to reconstruct at least a portion of the partitioned timed media data is identified as a function of an item of information associated with that component.

In an embodiment, the data structures and the data structure parameters of the manifest comply with DASH standard.

According to a second aspect of the invention there is provided a method for transmitting streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated components, the method comprising:

transmitting a manifest comprising a description of the components, the description comprising at least a dependency item of information indicating a dependency relation between a first and a second components and a dependency characterization item of information for interpreting the dependency item of information.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

According to a third aspect of the invention there is provided a method for transmitting streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated components, the method comprising:

transmitting a manifest comprising a description of the components, the manifest comprising at least two different descriptions of at least one component, a first of the at least two descriptions comprising at least a first dependency item of information indicating a dependency relation from the at least one component to another component and a second of the at least two descriptions comprising at least a second dependency item of information indicating a dependency relation from another component to the at least one component.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

In an embodiment, the data structures and the data structure parameters of the manifest comply with DASH standard.

According to a fourth aspect of the invention there is provided a method for generating streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated components, the method comprising:

obtaining dependency relations between components of a plurality of components of the partitioned timed media data and a characterization of dependency for each of the dependency relations; and transmitting a manifest comprising a description of the components, the description comprising at least a dependency item of information indicating a dependency relation between a first and a second components and a dependency characterization item of information for interpreting the dependency item of information.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

According to a fifth aspect of the invention there is provided a method for generating streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated components, the method comprising:

obtaining at least a first dependency item of information indicating a dependency relation from at least one component to another component and at least a second dependency item of information indicating a dependency relation from another component to the at least one component; and transmitting a manifest comprising a description of the components, the manifest comprising at least two different descriptions of at least one component, a first of the at least two descriptions comprising the at least a first dependency item of information and a second of the at least two descriptions comprising the at least a second dependency item of information.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

In an embodiment, the data structures and the data structure parameters of the manifest comply with DASH standard.

According to a sixth aspect of the invention there is provided a device for receiving streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated component, the device comprising at least one microprocessor configured for carrying out the steps of:

receiving a manifest comprising a description of the components;

selecting at least one component to reconstruct at least a portion of the partitioned timed media data;

obtaining from the manifest a dependency item of information indicating a dependency relation between the selected component and at least one other component;

obtaining from the manifest a dependency characterization item of information for interpreting the dependency item of information;

requesting the selected component and the at least one other component depending on the value of the dependency item of information in view of the dependency characterization item of information; and on reception of the requested components, reconstructing the corresponding portion of the partitioned timed media data from the received components and generating a playable media representation bit-stream.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

In an embodiment, the microprocessor is further configured so that the at least one other component is requested depending on the value of the dependency item of information in view of the dependency characterization item of information and as a function of a user's choice.

In an embodiment, the streamed timed media data is further organized into scalability layers, each layer being organized into temporal media segments.

In an embodiment, the dependency characterization item of information is indicative of a sub-stream conforming to the HEVC standard or of a sub-stream representing a spatial portion of the partitioned timed media data.

In an embodiment, the dependency characterization item of information is indicative of the type of the component the considered component depends on.

In an embodiment, the dependency characterization item of information is an attribute (also called element or descriptor) associated with the dependency item of information which indicates if the selected component corresponds to a subsample, a plurality of subsamples, or a sample.

In an embodiment, the selected component depends on another component which is representative of a sample comprising a subsample or a plurality of subsamples if the dependency characterization item of information indicates that the selected component corresponds to that subsample or that plurality of subsamples.

In an embodiment, the microprocessor is further configured so that first spatial information associated with the selected component is obtained from the manifest, the other component having other spatial information related to the first spatial information.

In an embodiment, the dependency characterization item of information further indicates which layer the encapsulated component belongs to.

In an embodiment, the dependency item of information is the "dependencyId" attribute and the dependency characterization item of information is the "@codec" attribute.

In an embodiment, the dependency characterization item of information is indicative of the type of dependency for the considered component.

In an embodiment, the dependency characterization item of information in the manifest refers to a type value of a set of different values, generated during a step of encapsulating the components.

Preferably, the set of different values corresponds to track reference type defined in ISOBMFF.

In an embodiment, the dependency characterization item of information is an attribute (also called element or descriptor).

In an embodiment, the set of type values comprises:

a first type value which indicates that the selection of the other component is mandatory to reconstruct the corresponding portion of the partitioned times media data, and/or a second type value which indicates that the selection of the other component is optional to reconstruct the corresponding portion of the partitioned times media data.

In an embodiment, the data structures and the data structure parameters of the manifest comply with DASH standard.

According to a seventh aspect of the invention there is provided a device for receiving streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated component, the device comprising at least one microprocessor configured for carrying out the steps of:

receiving a manifest comprising a description of the components, the manifest comprising at least two different descriptions of at least one component, a first of the at least two descriptions comprising at least a first dependency item of information indicating a dependency relation from the at least one component to another component and a second of the at least two descriptions comprising at least a second dependency item of information indicating a dependency relation from another component to the at least one component;

selecting at least one component to reconstruct at least a portion of the partitioned timed media data;

identifying one component needed to reconstruct the selected component, the component needed to reconstruct the selected component being identified as a function of the first dependency item of information of a description associated with the selected component or being identified as a function of the second dependency item of information of a description associated with that component;

requesting the selected and the identified component; and on reception of the requested components, reconstructing the corresponding portion of the partitioned timed media data from the received components and generating a playable media representation bit-stream.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

In an embodiment, the two different descriptions correspond to a component which is representative of a sample comprising at least two subsamples.

In an embodiment, the streamed timed media data is further organized into scalability layers, each layer being organized into temporal media segments.

In an embodiment, the microprocessor is further configured so that a component that can be selected to reconstruct at least a portion of the partitioned timed media data is identified as a function of an item of information associated with that component.

In an embodiment, the data structures and the data structure parameters of the manifest comply with DASH standard.

According to a eighth aspect of the invention there is provided a device for transmitting streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated components, the device comprising at least one microprocessor configured for carrying out the steps of:

transmitting a manifest comprising a description of the components, the description comprising at least a dependency item of information indicating a dependency relation between a first and a second components and a dependency characterization item of information for interpreting the dependency item of information.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

In an embodiment, the data structures and the data structure parameters of the manifest comply with DASH standard.

According to a ninth aspect of the invention there is provided a device for generating streamed timed media data organized into temporal media segments, the timed media data belonging to partitioned timed media data comprising timed samples, each timed sample comprising a plurality of subsamples, the timed media data being transmitted as at least two media segment files, each comprising at least one independently encapsulated components, the device comprising at least one microprocessor configured for carrying out the steps of:

obtaining dependency relations between components of a plurality of components of the partitioned timed media data and a characterization of dependency for each of the dependency relations; and transmitting a manifest comprising a description of the components, the description comprising at least a dependency item of information indicating a dependency relation between a first and a second components and a dependency characterization item of information for interpreting the dependency item of information.

Accordingly, a solution is provided for giving a richer dependency description mechanism: by extending streaming manifest files or by combining multiple information, qualified dependencies between video representations can be expressed. In particular, this solution can be easily integrated in the DASH MPD. By using this solution, a user is aware of the dependencies between media content components (scalability layers, spatial sub-videos), in particular if there are some additional media content components that are mandatory or optional in addition to selected media content components for a given ROI and aware of the HTTP addresses for downloading these sub-videos.

This solution enables a streaming client device to identify from a manifest file the required data as opposed to the optional data and to dynamically select a set of optional data to stream. Applied to tiles, this makes it possible to dynamically adapt the streaming to user-defined regions of interest.

With this invention, streaming client devices can be informed that the videos from a media presentation provide spatial access. By using information from the manifest, streaming clients can decide to dynamically switch to a specific spatial area of a video and also dynamically switch back to the full-frame video.

In an embodiment, the data structures and the data structure parameters of the manifest comply with DASH standard.

According to a tenth and an eleventh aspect of the invention there is provided a video decoder and a video encoder comprising the device described above.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIG. 4b illustrates the spatial relationships among media content components in MPD;

FIG. 6, comprising

FIG. 8, comprising

FIG. 10, comprising

DETAILED DESCRIPTION OF EMBODIMENTS OF THE INVENTION

A general embodiment of the invention is directed to the context of HTTP streaming of user-selected regions of interest in compressed video streams. User-selected regions mean regions of interest that are not predetermined (i.e. defined in advance), thus providing personalized access to the content.

According to embodiments of the invention, a rich dependency mechanism between media content components in the MPD is provided by explicitly extending the dependency mechanism or by implicitly extending the dependency mechanism by combining multiple items of information. Thus, qualified dependencies between video representations can be expressed and used by the client to efficiently select appropriate sets of media segments to download.

According to a particular embodiment of the invention, video sequences are encoded into independent spatial tiles and possibly multiple scalability layers. Each encoded tile is encapsulated in the file format as an independent track. One additional track (reference track) can be used to provide common data and to describe the composition of several tile tracks at a given scalability layer. The encapsulation is signaled in a manifest to inform streaming client on the availability of spatial access. The manifest further includes information allowing a client to determine the type of dependencies that exist between media content components (tracks). Thanks to the manifest, the client can determine the list of media segments to be downloaded for a given Region-of-Interest (ROI).

Based on such a general embodiment, several specific embodiments are described below, each resulting in a trade-off between extent of syntax modifications and completeness of the description.

Figure 1:
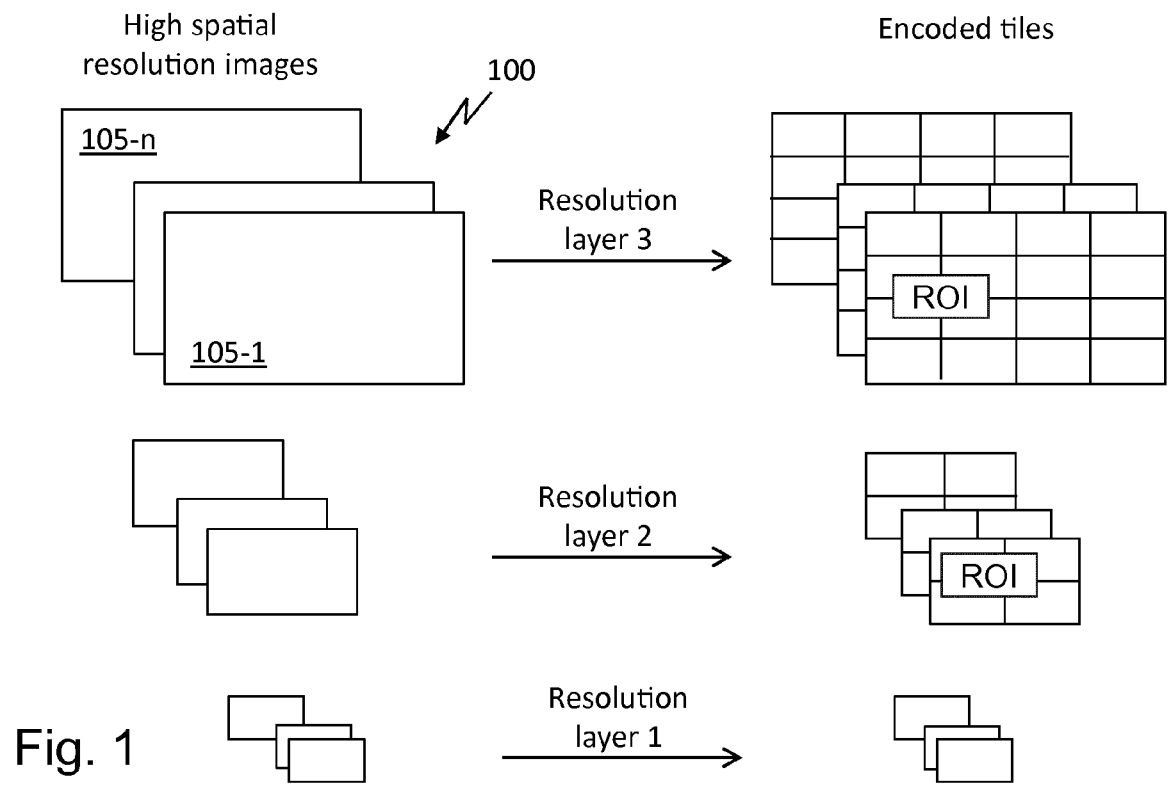
FIG. 1 illustrates schematically the use of tiles for streaming regions of interest of video sequences.

FIG. 1 illustrates schematically the use of tiles for streaming regions of interest of video sequences.

As illustrated, multiple resolution layers are computed from a high spatial resolution input video 100 comprising a set of images 105-1 to 105-*n* and each layer is divided into tiles, each tile being encoded independently. In alternative embodiments, tiles may also be encoded with some coding dependencies to other tiles at the same scalability layer or from other lower scalability layers. Similarly to a conventional video stream, a base layer tile may show the whole video scene. In alternative embodiments, the base layer may also be composed of several tiles. When a user wants to zoom into the video, tiles in the higher resolution layers are retrieved to provide higher quality details. Therefore, a client device needs to decode and synchronize multiple tiles for rendering a particular region of interest.

Alternatively, an overlapping tiling scheme can be used so that only one tile is needed to satisfy any region of interest. To handle different display sizes and network conditions, each tile is encoded at different spatial and quality resolutions.

Figure 2:
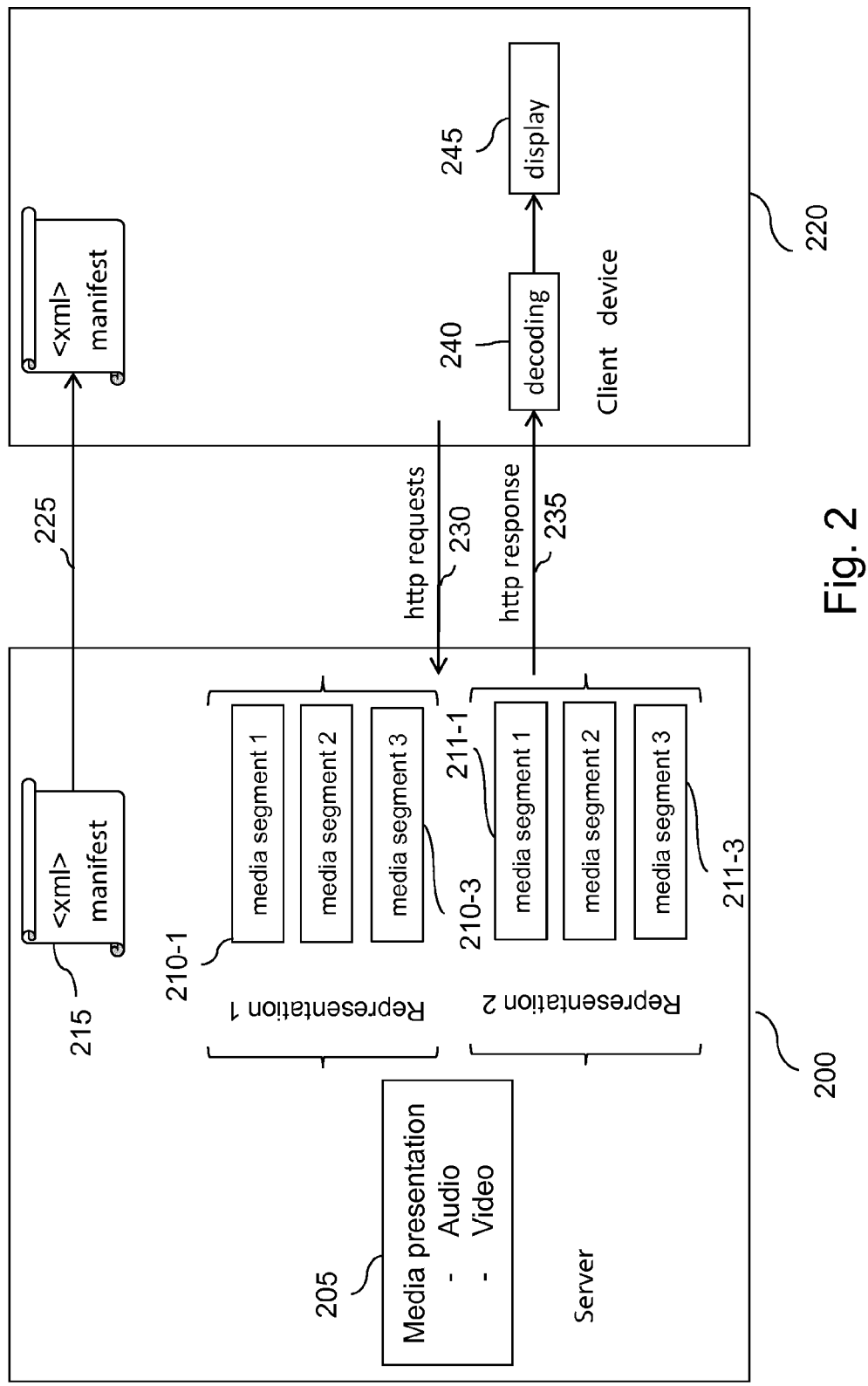
FIG. 2 illustrates a general principle of media streaming over HTTP, on which are based embodiments of the invention.

FIG. 2 illustrates a general principle of media streaming over HTTP, on which are based embodiments of the invention.

As illustrated, the media server 200 comprises media presentations among which, in particular, is media presentation 205 that contains different media content components, e.g. audio and video data streams. Audio and video streams can be interleaved or stored independently. The media presentation can propose alternative representations of media content components (with different bitrate, quality, resolution, sampling rate etc.).

An example of the way the media content components of this media presentation are encapsulated is described by reference to FIG. 3. As a result of the encapsulation step, each alternative representation (e.g. Representation 1 and Representation 2) is temporally split into small independent and consecutive temporal media segments 210-1 to 210-3 and 211-1 to 211-3, for example media segments conforming the MP4 standard (ISO/IEC 14496-14), that can be addressed and downloaded independently. Each media segment may contain one or more media content components. Addresses (i.e., HTTP URL addresses in the described embodiment) are set by server 200 for all the media segments and a manifest is created as described by reference to FIG. 3.

A manifest is a document, typically an XML file, that describes all media content components that can be accessed for a given media presentation. Such a description may comprise the types of the media content components (for example audio, video, audio-video, or text), the durations of the media segments, and the addresses (e.g. the URL) associated with the media segments, that is to say the addresses from which the media content components can be obtained.

Typically, an MPD is based on a hierarchical data model. It consists of one or multiple periods, each period having a starting time and a duration and consists of one or multiple adaptation sets. An adaptation set provides the information about one or multiple media content components and its various encoded alternatives, each encoded alternative of the same media content component being referred to as a representation. In turn, each representation typically consists of one or multiple media segments.

For the sake of illustration, audio and video streams of media presentation 205 are considered interleaved. Those interleaved audio and video data streams are proposed as two alternative representations, each representation being split into consecutive temporal media segments, for example split into three consecutive temporal media segments 210-1 to 210-3 and 211-1 to 211-3 corresponding to three consecutive periods of time. The manifest file describes the media presentation as composed of at least one adaptation set (not represented) that comprises at least two representations that contain several media segments. The addresses of these segments are set by server 200. These addresses and other items of information relative to the media content components and media segments 210-1 to 210-3 and 211-1 to 211-3 are accessible in manifest 215 corresponding to media presentation 205.

This manifest file is sent to client device 220 (step 225). After having been received, manifest file 215 is analyzed by client device 220 to determine available representations and accessible media segments 210-1 to 210-3 and 211-1 to 211-3 of media presentation 205, the http addresses of these media segments, and the relations between these media segments. Moreover, manifest file 215 gives items of information about the content of the media presentation (i.e. interleaved audio and video in the given example). These items of information may comprise a resolution, a bit-rate, and similar information.

In view of this information, client device 220 can therefore select media segments from appropriate representations to receive and emit corresponding http requests (step 230) for downloading these media segments. In response, server 200 transmits the requested temporal media segments (step 235). These temporal media segments can be decoded in decoder 240 and displayed on display 245.

Figure 3:
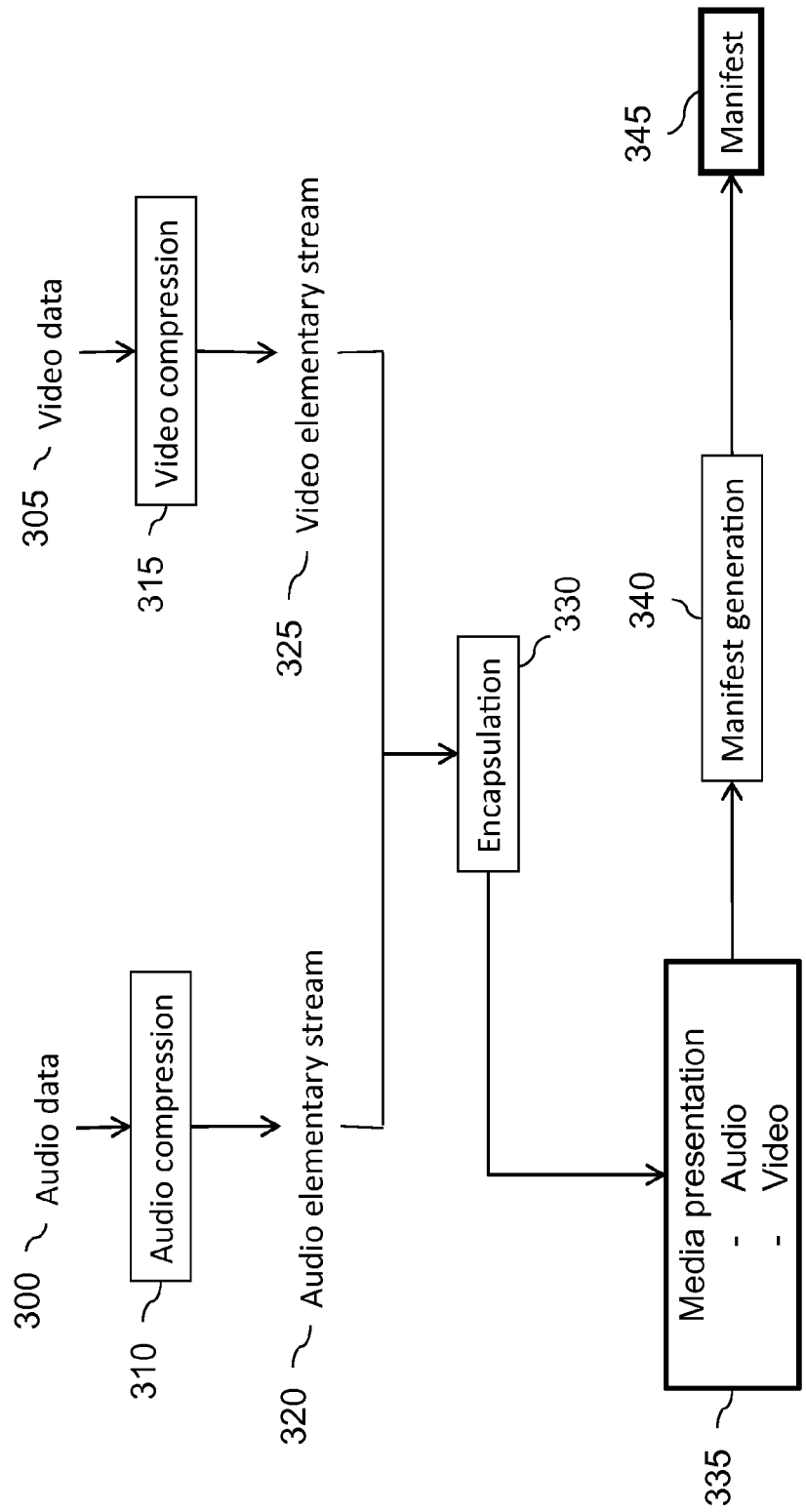
FIG. 3 illustrates steps for generating a media presentation and a corresponding manifest file.

FIG. 3 illustrates steps for generating a media presentation and a corresponding manifest file. Such steps are typically carried out by a server such as server 200 in FIG. 2.

Audio and video data denoted 300 and 305, respectively, can be obtained, for example, from an external source, via a communication network, such as a data storage server connected to the server carrying out the steps illustrated in FIG. 3.

Audio data are compressed during step 310. Such a compression can be based, for example, on the MP3 standard (MPEG-1/2 Audio Layer 3). In parallel (or before or after), video data are compressed during step 315. To that end, video data compression algorithms such as MPEG4, MPEG/AVC, SVC, HEVC, or scalable HEVC can be used.

The audio and video data are compressed as data elementary streams, as illustrated with references 320 and 325, respectively. These elementary streams are encapsulated during step 330 to create overall media presentation 335.

For example, the ISO BMFF standard (or, still for the sake of illustration, the extension of this ISO BMFF standard to AVC, SVC, HEVC or scalable HEVC) can be used for describing the content of the encoded audio and video elementary streams as an overall media presentation. Accordingly, the encapsulated media presentation is used as input for the generation (step 340) of a manifest, for example XML manifest 345.

Figure 4A:
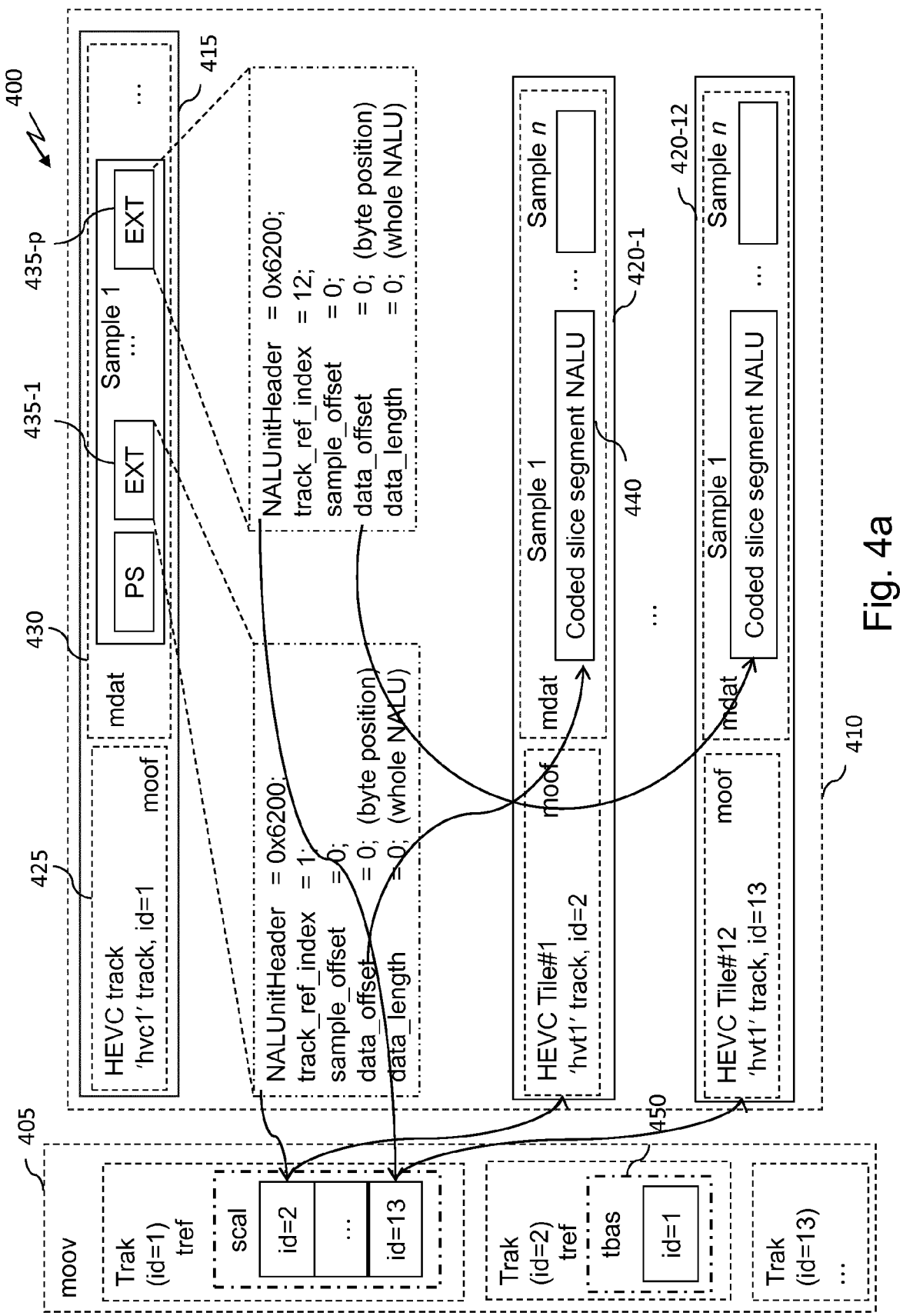
FIG. 4a illustrates an example of encapsulating an HEVC bit-stream as a set of tracks comprising a base track and independent tile tracks.

FIG. 4*a* illustrates an example of encapsulating an HEVC bit-stream as a set of tracks comprising a base track and independent tile tracks, allowing fast spatial and temporal access to video sub-parts according to ISO Base Media File Format. The HEVC bit-stream is encapsulated as a set of tracks comprising a base track (also called composite or reference track, denoted 415 in FIG. 4*a*) and independent tile tracks (denoted 420 in FIG. 4*a*). Each track forms a media content component that can be stored in a separate media segment. Thus, a client device can download only the media segments that correspond to the tiles to be displayed.

As described above, a manifest file (MPD) conforming to the DASH format is hierarchically organized by periods, adaptation sets, representations, and segments. In other words, a media presentation is split into temporal periods, the MPD containing all the data related to each period. By receiving corresponding items of information, a client device can determine the media presentation content for each period of time.

Again, this content is organized into adaptation sets, a possible organization being to have one or more adaptation sets per media content component type contained in the media presentation. An adaptation set relating to video data typically contains items of information about the different possible representations of the corresponding encoded video content component available from the server. For the sake of illustration, a first representation can be directed to video data encoded at a spatial resolution of 640×480 pixels and compressed at a bit-rate of 500 kbits/s. A second representation can be directed to a similar video content but compressed at a bit-rate of 250 kbits/s. Each representation can then be downloaded by a client device as media segments using http requests on condition that the client device knows the corresponding http addresses.

The association between video data of each representation and http addresses is made by using a specific level of description referred to as temporal media segments. Accordingly, each video representation is split into temporal media segments (having a duration of typically a few seconds). Therefore, each temporal media segment is a portion of a video content component stored in the server that is accessible through a particular http address (URL or URL with one byte range).

In addition, a specific segment known as the initialization segment is created and made accessible to a client device. This initialization segment may contain MP4 initialization items of information (if the video has been encapsulated by using the ISO BMFF or extensions) that describe the encapsulated video stream. For the sake of illustration, these items of information help a client device to instantiate the decoding algorithms relating to the accessed compressed video data. The http addresses of the initialization segment and of the media segments are given in the MPD file.

A concrete example of MPD file is given in FIG. 4*b*.

As illustrated in FIG. 4*a*, the encapsulated bit-stream 400 comprises an initialization segment file 405 containing a movie box ('moov') providing a definition for tracks and media segment file 410 representing a base track 415 and twelve tile tracks 420-1 to 420-12 (each of the tile tracks 420-1 to 420-12 being associated with one tile of the video sequence).

Base track 415 comprises a segment type box 'styp' (not represented), at least one movie fragment box 'moof' 425 comprising metadata such as a track segment type and an identifier, and at least one media data box 'mdat' 430 comprising, for each video data sample, PPS and references to video data.

Similarly, each of the tile tracks 420-1 to 420-12 comprises a segment type box 'styp' (not represented), at least one movie fragment box 'moof' comprising metadata such as a track segment type and an identifier, and at least one media data box 'mdat' comprising compressed video data packaged in NAL units (NALUs).

Tile tracks 420-1 to 420-12, having identifier 2 to 13, are referenced in track reference box 'tref' of initialization segment file 405 (more precisely of the movie box 'moov' of the initialization segment file 405, in the definition of the base track having identifier id=1).

As illustrated, base track 415 comprises extractors acting as pointers or references to data from other tracks. For the sake of illustration, several parameters amongst which an index of a tile track (track_ref_index), a data offset (data_offset), and a data length (data_length) corresponding to extractors 435-1 and 435-*p* of base track 415 are represented.

Still for the sake of illustration, when NAL unit 435-1 of base track 415 is processed, it is determined that it represents a NAL unit of the extractor type (NALUnitHeader equal to the hexadecimal value 6200). Accordingly, it is processed in order to retrieve corresponding compressed video data. To that end, its tile track index (i.e. track_ref_index=1) is obtained. From this index, it is possible to retrieve a tile track identifier from the tile track definitions stored in the initialization segment file 405. In the given example, since the index is equal to one, the first tile track identifier of the 'tref' box is selected (id=2). Next, this identifier is used to access the corresponding tile track and then, using data offset (i.e. a relative index of a sample in the identified track that is to be used as the source of information) and data_length (i.e. the number of bytes to copy, for example the whole NALU when data_length=0) parameters of extractor 435-1, compressed video data are extracted from tile track 420-1 (i.e. coded slice segment NALU 440 in the given example).

After having been processed an extractor is replaced by the data it references. According to the example illustrated in FIG. 4*a*, the parsing and processing of extractor 435-1 lead to its replacement by the coded slice segment NALU 440, thus forming an HEVC compliant bit-stream.

In the context of tiling and HEVC encapsulation, those extractors are specific extractors that, at parsing time, can support the absence of data. Accordingly, it is possible for an application to download only the media segments corresponding to the base track and the tile tracks that match its requested spatial area and it can still build an HEVC compliant bit-stream despite missing tile tracks.

An extract of code 1, given in the Appendix, illustrates an example of a standard DASH manifest, or MPD, for a given scalable media presentation. The aim of this example is to introduce the main characteristics of the MPD and to introduce how dependencies between representations is described in existing DASH specifications.

According to the illustrated example, two media are described. The first one is an English audio stream and the second one is a scalable video stream (using SVC). The English audio stream is introduced through the 'AdaptationSet' tag (500). Two representations are related to this audio stream:

the first representation, denoted 501, is an MP4 encapsulated elementary audio stream with a bit-rate of 64 kbytes/s. The codec that is required to handle this elementary stream (after mp4 parsing) is defined in the standard by the attribute 'mp4a.0x40'. It is accessible by a request at the address: <BaseURL>audio-64k.mp4</BaseURL>. The <BaseURL> being defined in the MPD by 'http://cdn1.example.com/' and by 'http://cdn2.example.com/' (two servers are available for streaming the same content), the client device can request the English audio stream from the request to one of the following addresses:
'http://cdn1.example.com/audio-64k.mp4' or
'http://cdn2.example.com/audio-64k.mp4'.
the second representation, denoted 502, is an MP4 encapsulated elementary audio stream with a bit-rate of 32 kbytes/s.

As illustrated, the adaptation set related to the video sequence, denoted 503, contains three representations. These representations contain videos at different spatial resolutions (320×240, 640×480, 1280×720) and at different bit-rates (from 512 to 1,024 kbytes per second).

The first representation is independent of any other videos (no @dependencyId attribute). The second representation is an enhancement layer of the first video. The dependency is signaled with the @dependencyId attribute (@dependencyId="tag5"). The third representation is dependent on both the first and second representation (@dependencyId="tag5 tag6"). According to DASH standardisation, the @dependencyId attribute "specifies all complementary Representations the Representation depends on in the decoding and/or presentation process as a whitespace-separated list of values of @id attributes". This dependency is mandatory to obtain a valid bit-stream. Thus, media segments from dependent representations must be preceded by the corresponding media segments of each of the complementary representations in the order as provided by the @dependencyId attribute.

For each of these representations, a different URL is associated. The client can therefore choose between these alternative representations of the same video according to different criteria like estimated bandwidth, screen resolution, etc. It is to be noted that for the sake of clarity, the decomposition into temporal segment is not illustrated in the example provided in the extract of code 1.

Standard MPDs as described by reference to the extract of code 1 present limitations regarding the description of tile tracks for the streaming of regions of interest. As described by reference to FIG. 4a, HEVC tiling encapsulation in File Format is performed using one track per tile plus a base track that contains data common to all tracks and possibly with extractors to all tile tracks.

If it is possible to describe tile tracks as representations of a full-frame video sequence, tile tracks may not be displayable (if they contain only tile data, initialization data for the decoder may miss). By using a standard MPD and one representation per tile track, streaming client devices would have no information on the possibilities of tile combination or even incompatibilities. Each tile would be seen as an alternative to another thus preventing multiple tile selection. The only combination that could be signaled is all tiles, using for example the dependencyId attribute in the Representation element of the composite track or no tile at all provided that the full-frame video sequence has its own Representation element in the manifest.

It is recalled here that it exists, in DASH, one attribute referred to as 'Representation@dependencyId' that allows expressing decoding and/or presentation dependency between representation of media content components. More precisely, the dependencyId attribute is an optional attribute that specifies all the complementary representations the processed representation depends on in the decoding and/or presentation process as a whitespace-separated list of values of @id attributes. If it is not present, the processed representation can be decoded and presented independently of any other representation. It shall not be present where there are no dependencies.

Several embodiments are presented herein below to overcome the above mentioned MPDs limitations.

The DASH standard introduces the ability to express spatial relationships among media content components in MPD either at Adaptation Set, Representation or SubRepresentation level. It consists in using either SupplementalProperty or EssentialProperty descriptors with @schemeIdURI equal to "urn:mpeg:dash:srd:2014". The @value attribute consists of a comma separated list of values for SRD ("Spatial Relationship Description") parameters:

source_id: provides the identifier for the source of the media content. The parameters (x, y, w, h) used in different SRD sharing the same value called "source_id value" within a Period may be compared to determine that two representations spatially relate to each other.

x: provides the horizontal position, in the reference space defined by this SRD descriptor, of the top-left corner of the Adaptation Sets, Representations or Sub-Representations using this descriptor.

y: provides the vertical position, in the reference space defined by this SRD descriptor, of the top-left corner of the Adaptation Sets, Representations or Sub-Representations using this descriptor.

w: provides the width, in the reference space defined by this SRD descriptor, of the Adaptation Sets, Representations or Sub-Representations using this descriptor.

h: provides the height, in the reference space defined by this SRD descriptor, of the Adaptation Sets, Representations or Sub-Representations using this descriptor.

W: provides the maximum extent in the x-axis of Representations or Sub-Representations having SRD with the same source_id value. When not present, this value is set to the W value of the SRD annotation having the same source_id value. For a given source_id value, at least one W value shall be specified.

Y: provides the maximum extent in the y-axis of Representations or Sub-Representations having SRD with the same source_id value. When not present, this value is set to the Y value of the SRD annotation having the same source_id value. For a given source_id value, at least one Y value shall be specified.

group_id: provides an identifier for a group of Representations or sub-Representations that have the same source_id value. The group_id can be used to indicate that a group of Representations or Sub-Representations form a group of non-overlapping or contiguous videos without gaps or are part of a same scalability layer.

The x and y parameters (respectively w and h) express 2D positions (respectively 2D sizes) of the associated Adaptation Set, Representation or Sub-Representation in the coordinate system associated to the source, identified by the source_id parameter. This coordinate system uses an arbitrary origin; the x-axis is oriented from left to right and the y axis from top to bottom. All SRD sharing the same source_id value have the same origin and axes orientations.

The W and H values define a reference space in this coordinate system. The values of the x, y, w, and h parameters are relative to the values of the W and H parameters. Positions (x,y) and sizes (w,h) of SRD sharing the same source_id value may be compared after taking into account the size of the reference space, i.e. after the x and w values are divided by the W value and the y and h values divided by the H value of their respective descriptors.

FIG. 4b gives an example of SRD descriptor with a video composed of 4 tiles (AS1 to AS4) in a reference space with arbitrary units. For the sake of illustration, only the MPD description for tiles AS1 and AS2 is shown.

The first Adaptation Set corresponds to the tile AS1. It is composed of one video Representation with a resolution of 1920×1080 pixels. A SRD descriptor (using Supplemental-Property descriptor) specifies that this video is a tile with source_id equals 1 and it is located at the top-left corner of the reference space (coordinates x=0 and y=0). The size of the video represents the half of the reference space in each direction (width and height cover 100 over the 200 arbitrary units of the reference space). It can be deduced from the SRD descriptor that the whole reference space indeed represents a 4k2k video (3840×2160 pixels).

From the SRD descriptor, we can deduce that the second Adaptation Set corresponds to the tile AS2. This SRD descriptor is introduced using this time an EssentialProperty descriptor specifying that the tile pertains to the same reference space than the first Adaptation Set (same source_id=1) and that it is located at mid-range on x-axis (value 100 over 200) and on the base of the y-axis (value 0).

The difference between SupplementalProperty and EssentialProperty descriptors is on the way the parent element (Adaptation Set or Representation) is handled by a client that does not understand the schemeIdURI "urn:mpeg:dash:srd:2014". Indeed, in case of EssentialProperty, if the client does not understand the schemeIdURI, then it must ignore it including the parent element that contains the descriptor. In case of SupplementalProperty, the client is just expected to ignore the descriptor itself but it can still use the parent element.

So when SRD descriptors are used in a MPD, it is recommended to rely on at least one SupplementalProperty descriptor for backward compatibility with clients that doesn't understand Spatial Relationship Description.

Figure 5:
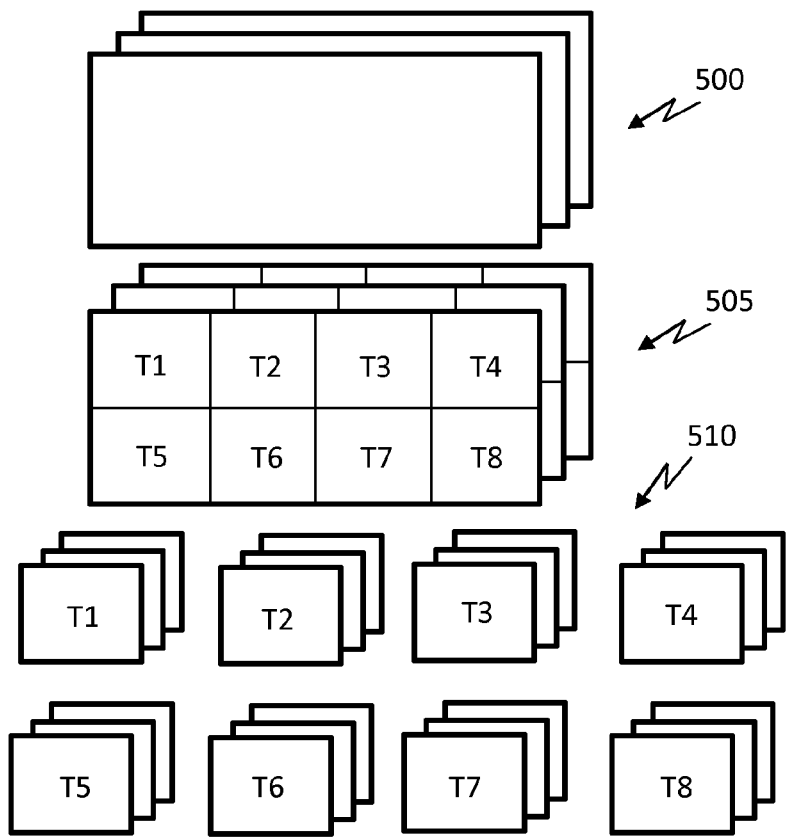
FIG. 5 illustrates video tiling and how it applies to compressed video data.

FIG. 5 illustrates video tiling and how it applies to compressed video data. As illustrated, video stream 500 comprises a set of consecutive temporal frames (for the sake of illustration, three consecutive temporal frames are represented). Each frame can be divided into rectangles, for example eight rectangles as illustrated with reference 505, referred to as tiles Tn (with n varying from 1 to 8). Naturally the number and the shape of the tiles can be different. However, for the sake of illustration, it is considered that tiling is the same whatever the index of the considered video frame.

As a result of the tiling, independent sub-videos (eight in the illustrated example) are obtained. These sub-videos, referred to as 510, are partitions of the whole video. Each independent sub-video can be encoded as an independent bit-stream conforming, for example, to AVC or HEVC standard, or it can be a part of a single video bit-stream such as a tile in an HEVC bit-stream or a slice in AVC.

This tiling organization of the video can be extended to other configurations, especially when considering scalable video encoding formats such as SVC or scalable HEVC.

HEVC standard defines different spatial subdivisions of pictures: tiles, slices and slice segments. These different partitions have been introduced for different purposes. The slices relate to streaming issues while the tiles and the slice segments have been defined for parallel processing.

According to the HEVC standard, a tile defines a rectangular region of a picture that contains an integer number of Coding Tree Units (CTU).

Figure 6A:
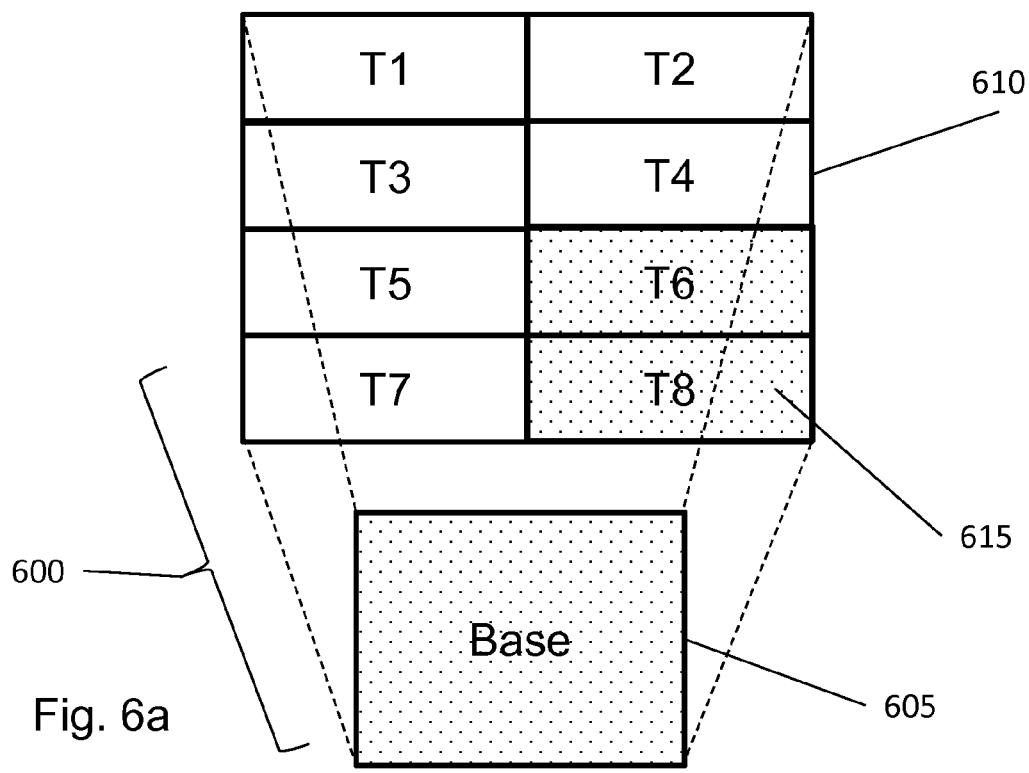
FIGS. 6a and 6b, illustrates examples of tiling configurations.
Figure 6B:
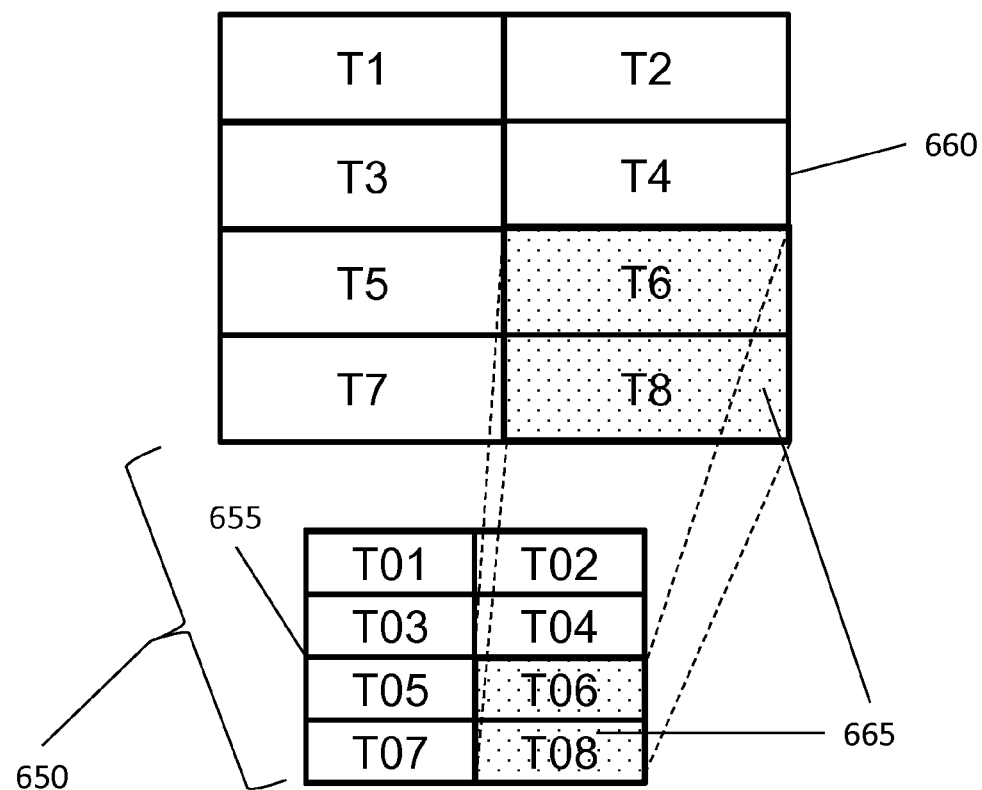

FIG. 6, comprising FIGS. 6a and 6b, illustrates two examples of tiling configurations.

FIG. 6a illustrates a particular tiling configuration wherein frame 600 of a video sequence (not represented) is encoded as a scalable video with a base layer frame 605 and a spatial enhancement layer frame 610 that is divided into eight tile portions (T1 to T8). According to this example, the base layer is not tiled. Therefore, each tile of the enhancement layer (e.g., each tile portion of the enhancement layer frame 610) depends on the whole base layer. In such a frame organization, when a portion of an image such as portion 615 is selected to stream a spatial part of the frames (e.g. the right bottom part of the frame 600), the selected tiles (e.g. tiles T6 and T8) and the base layer are needed. As illustrated in FIG. 6a, selected portion 615, representing a region of interest, is encompassed by the two tiles T6 and T8 and the base layer 605.

FIG. 6b illustrates another particular tiling configuration. As illustrated, a video sequence comprising frame 650 is encoded as a tiled base layer (i.e. tile base layer frame 655) and a tiled spatial enhancement layer (i.e. tiled spatial enhancement layer frame 660) with spatial dependencies that are tiled-based: one tile of the enhancement layer depends only on the tile at the same position in the base layer. In such a configuration, when a user selects a region of interest such as ROI 665, he/she needs the two tiles T6 and T8 of the enhancement layer frame 660 and the two reference tiles T06 and T08 of the base layer frame 655.

Figure 7:
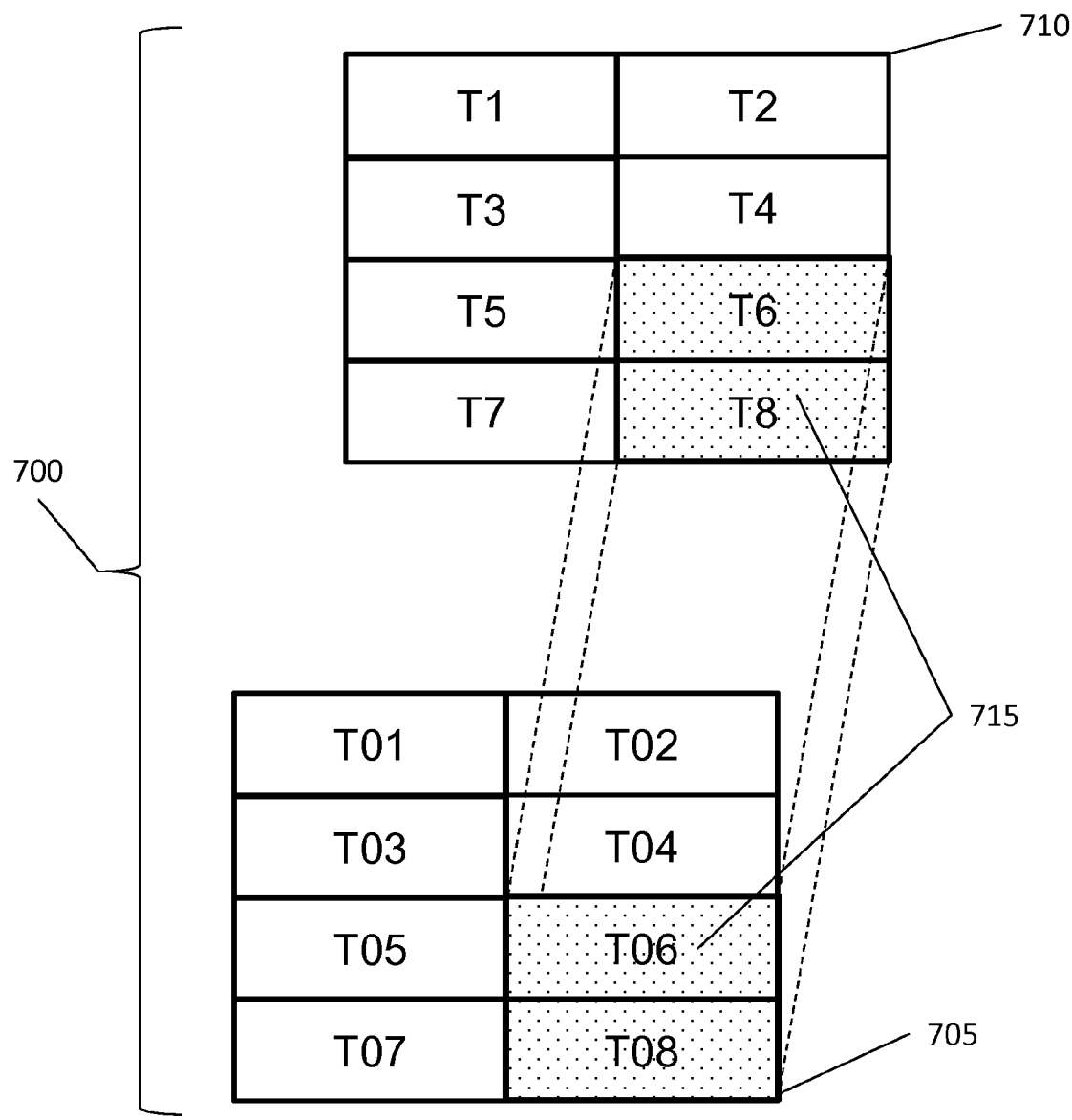
FIG. 7 illustrates an example of tiling configuration for scalability of the SNR (Signal-to-noise ratio) type.

FIG. 7 illustrates an example of tiling configuration for scalability of the SNR (Signal-to-noise ratio) type. In such a configuration, tiles of an enhancement layer, for example tile portions T1 to T2 of enhancement layer frame 710 of frame 700, depend on the same tiles of the base layer, for example on tile portions T01 to T08 of the base layer frame 705. Dependencies are tile-based. In such a case, when a user selects an image portion for streaming, for example area 715 of frame 700, tiles of the enhancement layer are streamed with the corresponding dependent tiles of the base layer, for example tile portions T6 and T8 from enhancement layer frame 710 are streamed with tile portions T06 and T08 of base layer frame 705.

A user-selected region of interest may correspond to one or several adjacent tiles (e.g., the combination of tiles T6 and T8 in the examples illustrated in FIGS. 6 and 7).

As described above, an embodiment of the invention can apply, in particular, to the HEVC video format.

According to HEVC standard, images can be spatially divided into tiles, slices, and slice segments. In this standard, a tile corresponds to a rectangular region of an image that is defined by horizontal and vertical boundaries (i.e., rows and columns). It contains an integer number of Coding Tree Units (CTU). Therefore, tiles can be efficiently used to identify regions of interest by defining, for example, positions and sizes for regions of interest. However, the structure of an HEVC bit-stream as well as its encapsulation as Network Abstract Layer (NAL) units are not organized in terms of tiles but are based on slices.

In HEVC standard, slices are sets of slice segments, the first slice segment of a set of slice segments being an independent slice segment, that is to say a slice segment for which general information stored within a header does not refer to that of another slice segment. The other slice segments of the set of slice segments, if any, are dependent slice segments (i.e. slice segments for which general information stored within a header refers to that of an independent slice segment).

A slice segment contains an integer number of consecutive (in raster scan order) Coding Tree Units. Therefore, a slice segment can be of a rectangular shape or not and it is thus not suited to represent a region of interest. It is encoded in an HEVC bit-stream I, in the form of a slice segment header followed by slice segment data. Independent and dependent slice segments differ by their header: since a dependent slice segment depends on an independent slice segment, the amount of information of its header is smaller than in the header of an independent slice segment. Both independent and dependent slice segments contain a list of entry points into the corresponding bit-stream that are used to define tiles or as entropy decoding synchronization points.

Figure 8A:
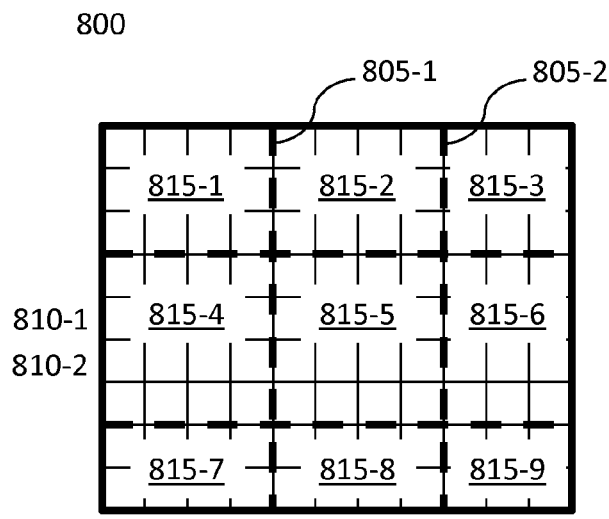
FIGS. 8a, 8b, and 8c, illustrates examples of tiles and slice segments.
Figure 8B:
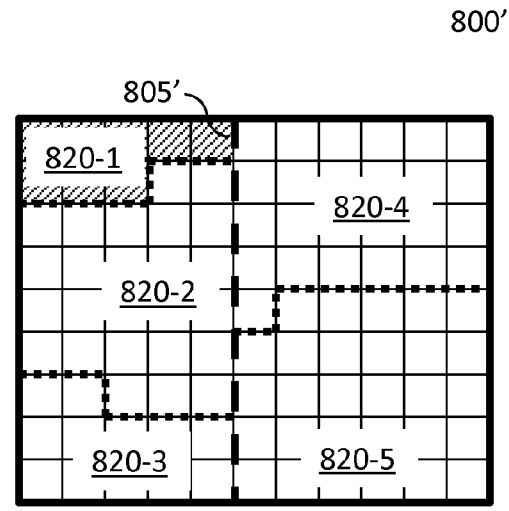
Figure 8C:
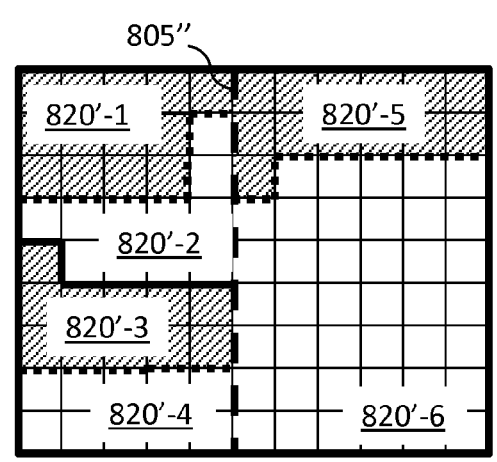

FIG. 8, comprising FIGS. 8a, 8b, and 8c, illustrates examples of tiles and slice segments. More precisely, FIG. 8a illustrates an image (800) divided into nine portions by vertical boundaries 805-1 and 805-2 and horizontal boundaries 810-1 and 810-2. Each of the nine portions referenced 815-1 to 815-9 represents a particular tile.

FIG. 8b illustrates an image (800') containing two vertical tiles delimited by vertical boundary 805'. Image 800' comprises a single slice (not referenced) containing five slice segments, one independent slice segment 820-1 (represented with hatched lines) and four dependent slice segments 820-2 to 820-5.

FIG. 8c illustrates an image (800") containing two vertical tiles delimited by vertical boundary 805". The left tile comprises two slices: a first slice containing one independent slice segment (820'-1) and one dependent slice segment (820'-2) and a second slice also containing one independent slice segment (820'-3) and one dependent slice segment (820'-4). The right tile comprises one slice containing one independent slice segment (820'-5) and one dependent slice segment (820'-6).

According to HEVC standard, slice segments are linked to tiles according to rules that may be summarized as follows (one or both conditions have to be met):

all CTUs in a slice segment belong to the same tile (i.e. a slice segment cannot belong to several tiles); and all CTUs in a tile belong to the same slice segment (i.e. a tile may be divided into several slice segments provided that each of these slice segments only belongs to that tile).

For the sake of clarity, it is considered in the following description that one tile contains one slice having only one independent slice segment. However, embodiments of the invention can be carried out with other configurations such as the ones illustrated in FIGS. 8b and 8c.

As mentioned above, while tiles can be considered as an appropriate support for regions of interest, slice segments are the entities that are actually put in NAL units for transport over a communication network and aggregated to form access units (i.e. coded pictures or samples at file format level).

It is to be recalled that according to HEVC standard, the type of a NAL unit is encoded over two bytes of the NAL unit header that can be defined as follows:

```
nal_unit_header ( ) {
    forbidden_zero_bit
    nal_unit_type
    nuh_layer_id
    nuh_temporal_id_plus1
}
```

NAL units used to code slice segments comprise slice segment headers indicating the address of the first CTU in the slice segment thanks to a slice segment address syntax element. Such slice segment headers can be defined as follows:

```
slice_segment_header ( ) {
    first_slice_segment_in_pic_flag
    if(nal_unit_type >= BLA_W_LP &&
        nal_unit_type <= RSV_IRAP_VCL23)
        no_output_of_prior_pics_flag
    slice_pic_parameter_set_id
    if(!first_slice_segment_in_pic_flag){
        if(dependent_slice_segments_enabled_flag)
            dependent_slice_segment_flag
        slice_segment_address
    }
    If(!dependent_slice_segment_flag){
    [...]
```

Tiling information is provided in a PPS (Picture Parameter Set) NAL unit. The relation between a slice segment and a tile can then be deduced from these parameters.

While spatial predictions are reset on tile borders (by definition), nothing prevents a tile from using temporal predictors from a different tile in the reference frame(s). Accordingly, to build independent tiles, motion vectors for the prediction units are advantageously constrained inside a tile, during encoding, to remain in the co-located tile in the reference frame(s). In addition, the in-loop filters (deblocking and sample adaptive offset (SAO) filters) are preferably deactivated on the tile borders so that no error drift is introduced when decoding only one tile. It is to be noted that such a control of the in-loop filters is available in HEVC standard. It is set in slice segment header with a flag known as loop_filter_across_tiles_enabled_flag. By explicitly setting this flag to zero, the pixels at the tile borders cannot depend on pixels that fall on the border of the neighbor tiles. When these two conditions relating to motion vectors and to in-loop filters are met, tiles can be considered as "independently decodable tiles" or "independent tiles". This information on tile coding dependencies can be set in a dedicated SEI (Supplemental Enhancement Information) message of the HEVC bit-stream to signal ROI information.

When a video bit-stream is encoded as a set of independent tiles, it then enables tile-based decoding from one frame to another without any risk of missing reference data or propagation of reconstruction errors. This configuration then makes it possible to reconstruct only a spatial part of the original video that can correspond, for example, to a region of interest illustrated in FIGS. 6 and 7 (comprising tiles T6 and T8). Such a configuration, independent tiles, and tile-based dependencies, can be indicated in SEI messages in the video bit-stream. This can be exploited in encapsulation and description level so as to indicate that tile-based decoding is reliable.

Before being described in a manifest, each tile must be processed for being encapsulated in a standard format. Such an encapsulation stage is described by reference to FIG. 3. For the sake of illustration, the encapsulation format complies with ISO BMFF standard (or is an extension of a media file conforming to this standard). This is one of the formats for which the MPEG/DASH standard specifies construction guidelines.

Independent tiles are provided as an input of an encapsulation module and each tile is considered as an independent track for encapsulation. For each encoded tile, a tile track is defined in the resulting ISO BMFF file. Each tile track then represents a spatial part of the whole (or full-frame) video. Additional tracks such as an audio track or a text track can be used and encapsulated in the same file.

A composite track is created and defined in the ISO BMFF file. It is used to handle any combination of tiles.

According to the organization of tile tracks and of the composite track, tile data are split into independent and addressable tracks so that any combination of tile tracks can easily be constructed from a composite track that references the tile tracks.

For each tile track, tile items of information such as tile position, tile size, and bandwidth are stored in track header, for example in track header boxes known as 'moov' box. For streaming, these items of information can be stored in an initialization segment defined in DASH standard.

In addition to the initialization segment, the encapsulation process generates segment files (media segments that may be accessed through a URL when the MPD is generated) that correspond to small periods of time. The segments typically correspond to movie fragments (e.g. boxes known as 'moof' and 'mdat'). One mp4 segment file is generated per movie fragment and per tile track so that each spatio-temporal portion of the video becomes addressable.

The composite track follows the same temporal decomposition and can also be addressed temporally. It is mainly composed of extractors, typically mp4 extractors, each extractor referencing one tile track. It also contains specific extractors that, at parsing time, support the absence of data. Of course, the number of movie fragments and the corresponding mp4 segments as well as their granularity are not limited. The choice is done as a function of the application.

The encapsulation process is used by a manifest generator to describe in the manifest the video contained in the media presentation.

As explained above, the current streaming manifests, in particular the MPD, do not enable a video stream to be described as a set of optional and switchable components. Moreover, according to the current encapsulation scheme, the only video track that can be displayed is the one resulting from the mp4 parsing of the composite track (i.e. resolution of the extractors). The tile tracks are not intended to be displayable by themselves.

Therefore, a composite track is described in a manifest as the addressable video representation. Since the composite track is built from extractors pointing to tile tracks, the composite track does not itself contain any data (except some header items of information that are common to the tile tracks). This means that tile tracks also have to be described in the manifest and depending on the tile selection by the user (or the client), some of them also have to be downloaded.

So one problem to be solved is how to describe composite and tile tracks in the MPD and how to express the dependencies between them so that the client can distinguish between mandatory dependencies and optional dependencies.

According to a first embodiment, no extra attribute and/or element are signaled within the MPD. Therefore, the existing 'representation@dependencyId' attribute is used to signal that the representation of a media content component depends on another representation from another media content component. However, another item of information obtained from the MPD, for example the attribute known as @codec, is used to determine whether or not the dependency is mandatory or optional.

According to the file format definition, the @codec attribute values indicate the type of the media content component. The current values of the @codec attribute are the following:
'hvc1', 'hev1', 'hvc2', and 'hev2' indicate different types of HEVC stream; and
'hvt1' indicates a tile track sub-stream.

Figure 13:
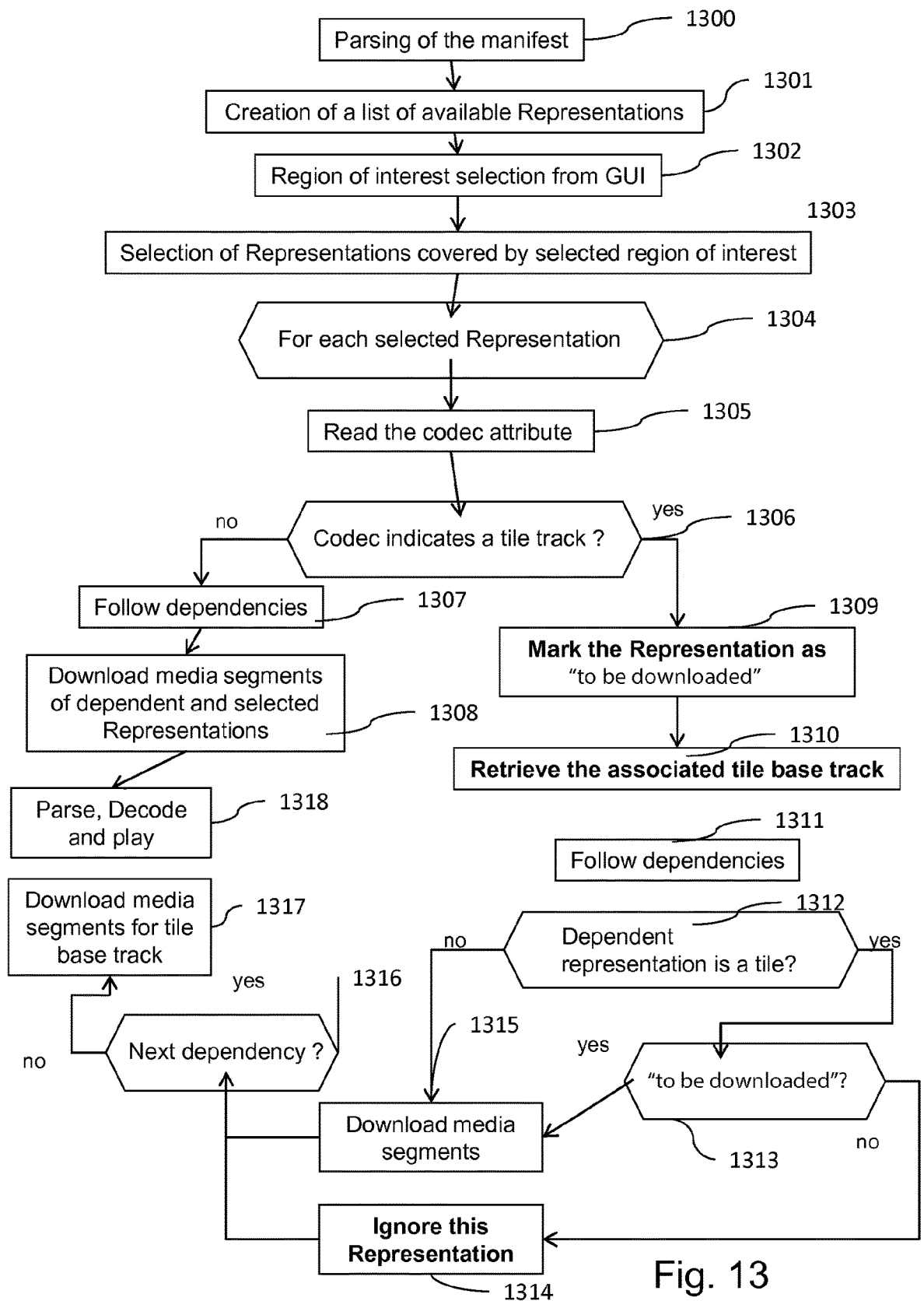
FIGS. 13, 14, and 15 are flowcharts which illustrate embodiments according to the invention.

FIG. 13 illustrates an example of the first embodiment. According to this embodiment, the @codec attribute value is used to determine the type of dependencies according to the following algorithm (or the like):
client device parses 1300 the manifest and builds a list of available representations 1301; this list may contains potential Representations at different scalability layers including potential Representations corresponding to the composite or reference tracks for the tile also called tile "base tracks" and Representations corresponding to spatial tile tracks;
the client device identifies the required Representations 1303 to play according to the spatial area selected by the user 1302, the resolution of the display, the available bandwidth, the desired frame rate. The MPD provides all information needed by the client to perform its choice in the description of each Adaptation Set/Representation. In particular, SRD descriptors (as described in reference to FIG. 4b) provides information on the spatial area covered by a Representation;
Once the client has selected at least one Representation 1304, the media component type corresponding to the Representation is checked by looking at Representation@codec attribute 1305.

If this attribute is different from 'hvt1' 1305 (defined above), the classical algorithm defined by DASH is used to download media segments associated to this Representation as well as media segments of all dependent Representations (defined by the Representation@dependencyId attribute) if any 1307, 1308. In such a case all dependencies are considered mandatory.

Otherwise if the attribute Representation@codec of the selected Representations is 'hvt1' 1306, the following algorithm is used according to the invention. It allows resolving all dependencies and determining the list of media segments to download.

By definition, Representation with @codec='hvt1' corresponds to HEVC tile track (i.e. spatial sub-part of HEVC stream). In such track, neither the samples in the track nor the sample description box shall contain VPS, SPS nor PPS NAL units. These NAL units shall be in the samples or in the sample description box of the associated tile base track (reference/composite track). In other words the Representation with @codec='hvt1' can't be played alone and that the associated tile base track must also be downloaded. So there are implicit dependencies between a tile track and its tile base track. Before retrieving the requested tile base track, the client marks all dependencies of current tile track 1309 signaled with the attribute Representation@dependencyId to be downloaded but it doesn't download them yet. First its associated tile base track needs to be identified. Moreover the scalability dependencies may be resolved.

Then the associated tile base track is retrieved 1310. To this end, the SRD descriptor can be used to retrieve the Representation having the same source_id and same group_id with an attribute Representation@codec corresponding to the requested layer (i.e. This is the representation with @codec≠'hvt1').

If the group_id is not explicitely defined, it is deduced from tuple (W,H). Representations having same tuple (W,H) implicitly form a common group of Representations.

Next the client resolves the dependencies 1311 of the tile base track Representation as follows:
the @dependencyId attribute provides the list of dependent representations;

for each dependent representation:
  the client device checks the associated @codec attribute (@codec='hvt1' indicates that the dependent representation is a tile track sub-stream) 1312,
    If @codec='hvt1', the dependency is optional 1313, 1314 except if the dependent Representations have been marked as mandatory to download in previous steps;
    if the current representation is not of the 'hvt1' type (@codec≠'hvt1'), it means the dependent representation is a scalable sub-layer representation and so it is marked as mandatory to download 1315;
  The client performs the above algorithm recursively on all dependent Representations 1316;
  the client device downloads media segments corresponding to all Representations marked as mandatory 1317 (if one Representation appears several time, it is downloaded once); and
  the client device parses the concatenated media segments and resolves extractors that point to non-void data (i.e. selected tile(s)) 1318.

Figure 9:
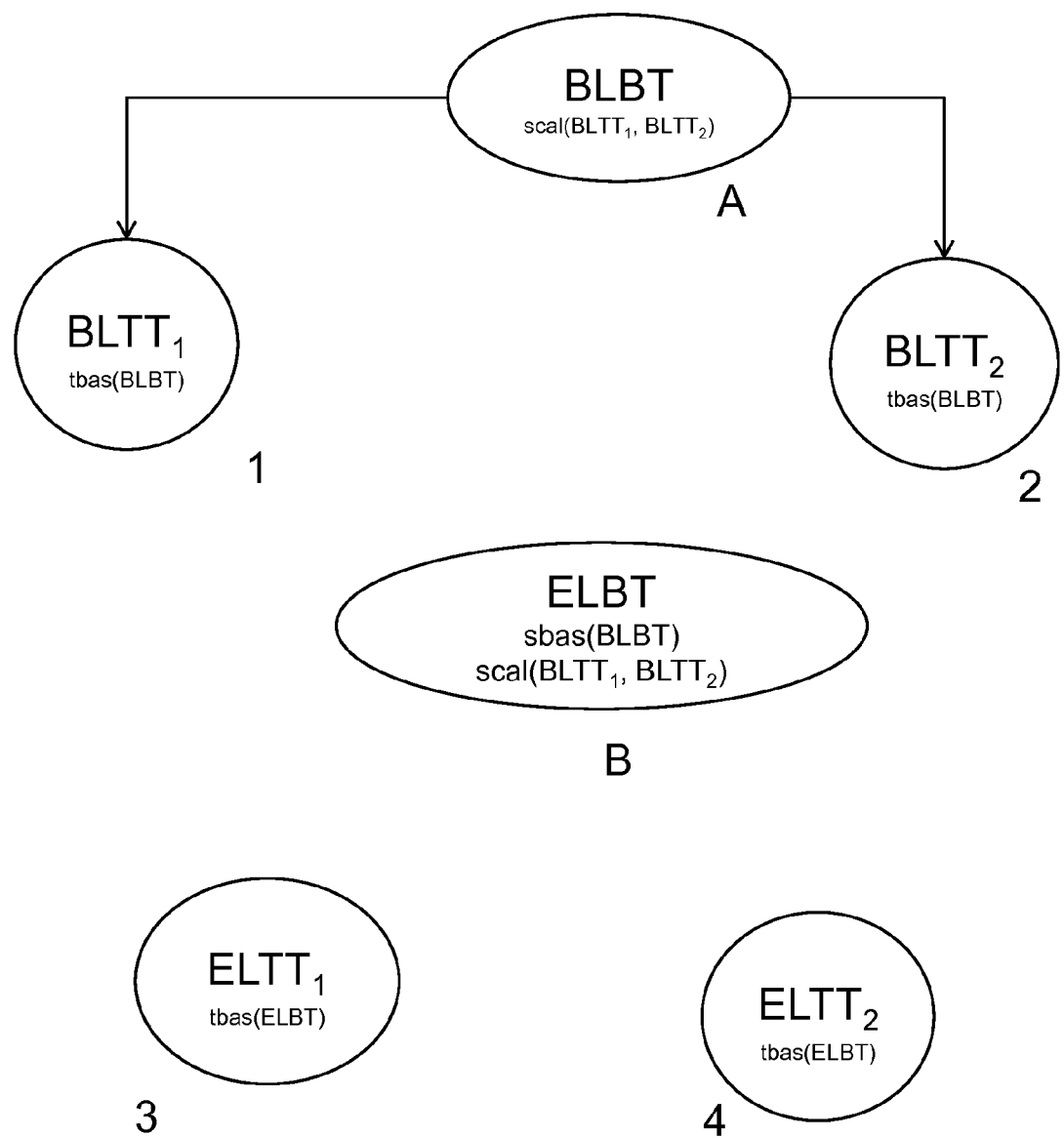
FIG. 9 illustrates an example of dependencies to be solved in a tiling configuration comprising two scalability layers, each layer comprising two tiles.

FIG. 9 illustrates an example of dependencies to be solved in a tiling configuration comprising two scalability layers, each layer comprising two tiles, to illustrate the implementation of the invention according to the first embodiment.

As illustrated, the base layer is composed of a base layer base track (BLBT), having the identifier A, that depends on two tiles (BLTT$_1$ and BLTT$_2$), having the identifiers 1 and 2. These three Representations form a SRD group with group_id=1. Likewise, the enhancement layer is composed of an enhancement layer base track (ELBT), having the identifier B, that depends on the base layer (BLBT), due to scalability, and that depends on tiles from the enhancement layer (ELTT$_1$ and ELTT$_2$), having identifiers 3 and 4. The enhancement layer with the two associated tiles form a SRD group with group_id=2.

In addition as illustrated in FIG. 9, due to scalability, the tile ELTT1 depends on the tile BLTT1 and the tile ELTT2 depends on BLTT2

The @codec attributes of the tracks corresponding to these layers and to these tiles can be expressed as follows:

```
    <Representation id=1 codec="hvt1" >
       <!-- SRD for tile BLTT1 -->
<SupplementalProperty schemeIdUri="urn:mpeg:dash:srd:2014"
value="1, 0, 0, 100, 200, 200, 200, 1"/>
       <\Representation>
    <Representation id=2 codec="hvt1" >
       <!-- SRD for tile BLTT2 -->
       <SupplementalProperty schemeIdUri="urn:mpeg:dash:srd:2014"
value="1, 100, 0, 100, 200, 200, 200, 1"/>
       <\Representation>
    <Representation id=A codec="hev1" dependencyId="1 2">
       <!-- SRD for full resolution (base layer) -->
<SupplementalProperty schemeIdUri="urn:mpeg:dash:srd:2014"
value="1, 0, 0, 200, 200, 200, 200, 1"/>\>
       <\Representation>
    <Representation id=3 codec="hvt1" dependencyId="1">
<!-- SRD for tile ELTT1 -->
<SupplementalProperty schemeIdUri="urn:mpeg:dash:srd:2014"
value="1, 0, 0, 100, 200, 200, 200, 2"/>
       <\Representation>
    <Representation id=4 codec="hvt1" dependencyId="2">
       <!-- SRD for tile ELTT2 -->
<SupplementalProperty schemeIdUri="urn:mpeg:dash:srd:2014"
value="1, 100, 0, 100, 200, 200, 200, 27"/>
       <\Representation>
    <Representation id=B codec="hev1" dependencyId="A 3 4"\>
       <!-- SRD for full resolution (enhancement layer) -->
<SupplementalProperty schemeIdUri="urn:mpeg:dash:srd:2014"
value="1, 0, 0, 200, 200, 200, 200, 2"/>
       <\Representation>
``` wherein the value is set to 'hev1' for the tile track sub-streams (i.e. base layer tile track and enhancement layer tile tracks).

Figure 14:
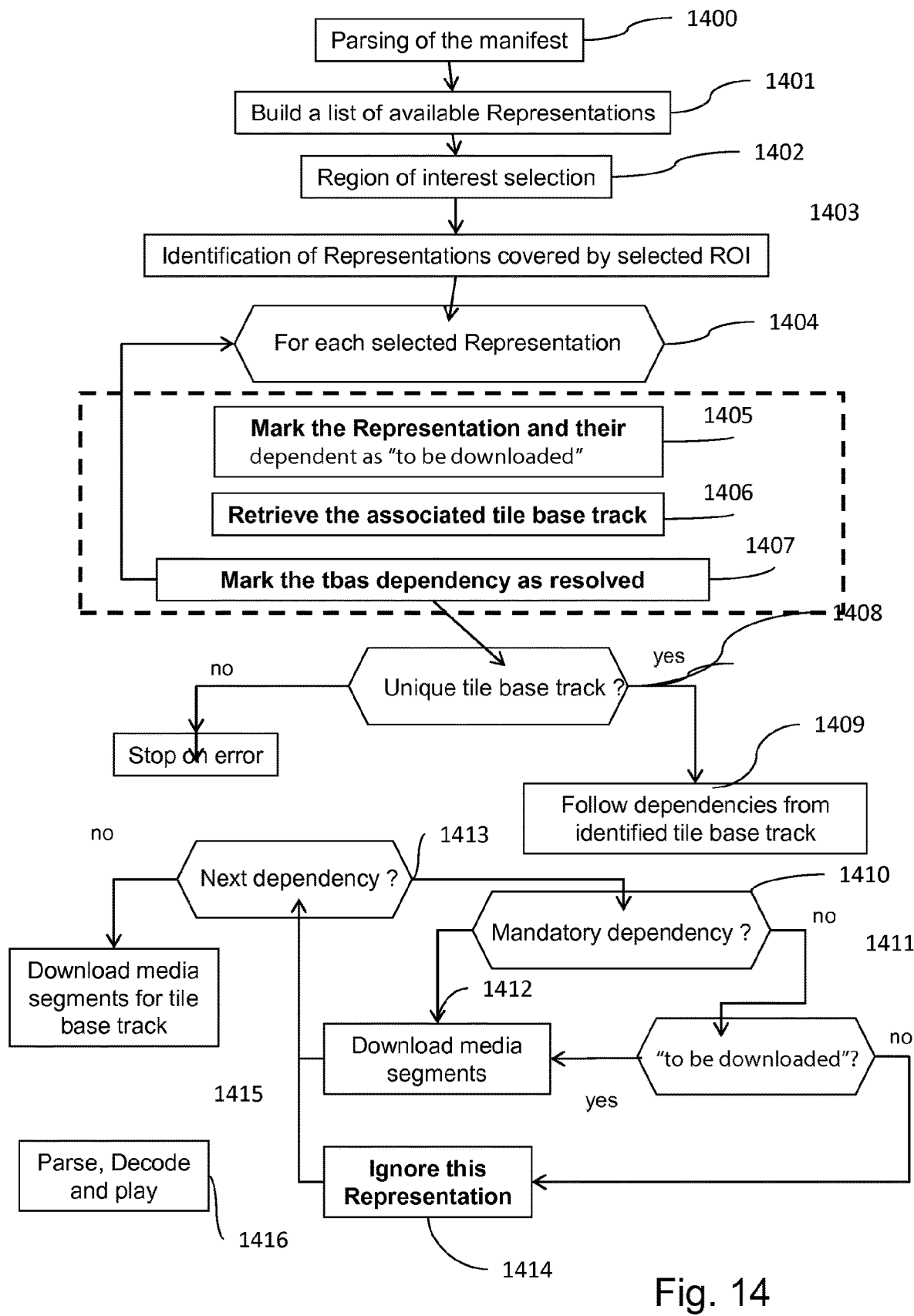

For the sake of illustration, if a user wants to display a sub-part of the video in the enhancement layer corresponding to the tile ELTT1, a first step consists, according to the algorithm described above, in the steps described below by reference to FIG. 14.

According to the algorithm, it first looks for the representation corresponding to the tile ELTT1 using the spatial description from SRD descriptors. It finds that the representation with id=3 matches its criteria. Then it determines that this representation has a codec type 'hvt1' meaning that this is a tile track. This tile track has a dependencyId that defines a dependency to the Representation with id=1. The Representation 1 is marked as mandatory to download.

As the selected Representation during the first step has the @codec attribute equals to 'hvt1', the client then looks for the associated tile base track. So it looks for a representation with codec="hev1" having same source_id and group_id.

The client finds the representation B that corresponds to these criteria. B depends on representations A, 3 and 4. Without the invention it would have marked all these representations as mandatory to download. With the invention, it first looks at the codec of each dependent representations:
  representation A whose @codec value is equal to 'hev1', from which it is determined that this representation is mandatory to download since it corresponds to the base layer. The client device marks this representation as to be downloaded but does not download it immediately; and
  both representations 3 and 4 have codec=hvt1, so it deduces those representations correspond to tile tracks. Those dependencies are identified as optional.

Then it follows the dependencies for the Representation A (marked as mandatory in previous step) that depends on two Representations 1 and 2. Those both dependent Representations have @codec attribute with value 'hvt1', so those dependent Representations are optional a priori except that the Representation 1 has already been identified as mandatory. So media segments from this Representation will be downloaded.

As a conclusion, the download order according to @dependencyId attributes would be BLTT1, BLBT, ELTT1, ELBT.

Next, the process is carried out on a standard basis to obtain the required tracks that are decoded and displayed.

According to a second embodiment, a new attribute, denoted here @dependencyType, is created to explicitly characterize the type of dependencies defined by the @dependencyId attribute.

It is to be recalled that according to a standard file format definition, track relationships are described through track reference types ('tref' box). For example, the 'tbas' type indicates a track that depends on a reference track for common data shared among a set of tiles, the 'scal' type indicates that a track depends on data of a reference track, and the 'cdsc' type indicates that a track providing description of the content in the referenced track (ex: metadata).

For example in case of metadata, using the @dependencyType attribute, the DASH client is informed that the metadata Representation provides description of the dependent video Representation (meaning of 'cdsc'). Without this new @dependencyType attribute, if the client selects one of the metadata Representation, it would be led to download the dependent video Representation since the @dependencyId attribute described it as a complementary Representation on which the metadata Representation depends for decoding and/or presentation.

This can be used for MPEG-Green metadata or quality metrics metadata (see code 1 in appendix).

These types can be reused in the MPD with the advantage of reflecting the defined relationship at the encapsulation level.

Figure 10A:
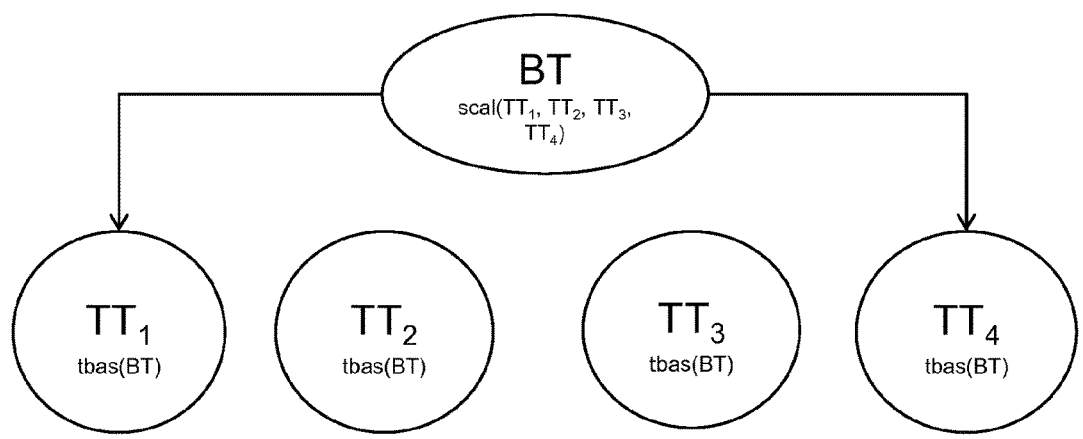
FIGS. 10a and 10b, illustrates two examples of dependencies to be solved in two tiling configurations, without scalability and with scalability, respectively.
Figure 10B:
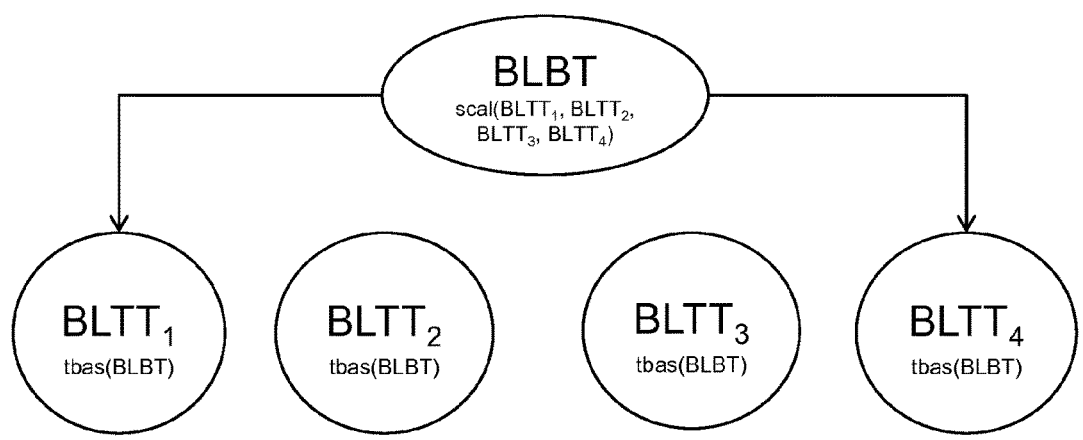
Figure 10B:
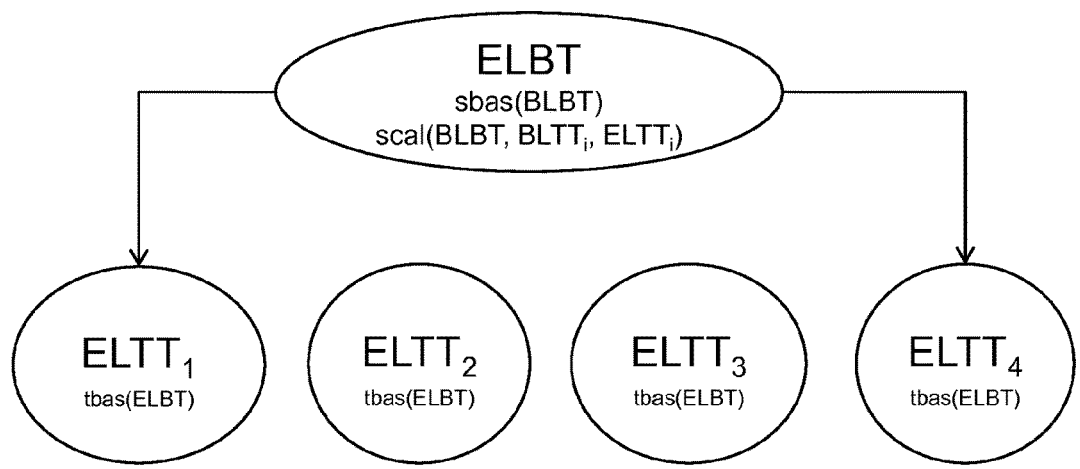

FIG. 10, comprising FIGS. 10a and 10b, illustrates two examples of dependencies to be solved in two tiling configurations, without scalability and with scalability, respectively, to illustrate the implementation of the invention according to the second embodiment.

As illustrated 10a, the tiling configuration comprises a base track (BT) that depends on four tiles (TT$_1$ TT$_4$). Accordingly, when there is no scalability, the following descriptions can be obtained:

```
/* ---- Base track ---- */
<Representation id= 'BT' codec='xxx.hev1.xxx' dependencyId='TT1 TT2... TTN' dependencyType='tile' .../>
/* ---- Tile track ---- */
<Representation id="Ti" codec='xxx.hvt1.xxx' dependencyId='BT' dependencyType='tbas' .../>
```

In above example, the dependency between the tile base track (reference/composite track) and its associated tile tracks is defined using a new dependency type 'tile'. Instead of defining a new reference type 'tile', alternative embodiment could be to keep the existing reference type as used in file format (type 'scal') and to combine this information with information from the @codec attribute in order to remove the existing ambiguity between the reference 'scal' used to signal scalability dependency and 'scal' used to signal tiling dependencies. Indeed, if a Representation has a dependency of type 'scal' to a dependent Representation with @codec attribute equals to 'hvt1', it can deduce that this dependency is a dependency to a tile.

As illustrated in FIG. 10b, the base layer is composed of a base layer base track (BLBT) that depends on four tiles (BLTT$_1$ to BLTT$_4$). Likewise, the enhancement layer is composed of an enhancement layer base track (ELBT) that depends on the whole base layer (BLBT+BLTT$_1$+BLTT$_2$+BLTT$_3$+BLTT$_4$), due to scalability, and that depends on tiles from the enhancement layer (ELTT$_1$ to ELTT$_4$). Accordingly, when there is scalability, the following descriptions can be obtained:

```
/* ---- Base Layer base track ---- */
<Representation id= 'BLBT' codec='xxx.hev1.xxx'
dependencyId='BLTT1 BLTT2... BLTTN' dependencyType='tile' .../>
/* ---- Base Layer tile track ---- */
<Representation id='BLTTi' codec='xxx.hvt1.xxx'
dependencyId='BLBT' dependencyType='tbas' .../>
/* ---- Enhancement Layer Base track ---- */
<Representation id= 'ELBT'
codec='xxx.hev1.xxx' dependencyId='BLBT,ELTT1...ELTTN'
dependencyType='scal, tile, tile, ...' .../>
/* ---- Enhancement Layer Tile track ---- */
<Representation id='ELTi' codec='xxx.hvt1.xxx'
dependencyId='ELBT' dependencyType='tbas' .../>
```

The following algorithm can be implemented in a client device for retrieving the media segments to download depending on the selected spatial area:
- the client device parses 1400 the manifest and builds a list of representations tiles 1401; this list may contain Representations at different scalability layers potentially including Representations corresponding to tile base tracks (also known as composite/reference tracks) and Representations corresponding to spatial tile tracks;
- a user selects a spatial area on a video 1402,
  - using the values of the SRD@x,y attribute, the client device translates this selection into a list of candidate representations 1403. It is to be noted that the values of the SRD@W,H attribute can be of help for selecting the appropriate spatial resolution; once the client has selected the candidate Representations (tiles) it wants to play 1405, it can retrieve the associated tile base track by looking at dependencyId with dependencyType set to 'tbas'.
- the client device gets, for the candidate representations, the identifier of the representation of which the @dependencyType attribute is equal to 'tbas' 1406, this provides the base track that contains common initialization information; this is an error if different tile base tracks are found 1408;
- the client device marks the dependency as resolved 1407 for candidate representations, without downloading these representations at that time,
- If the candidate Representations have dependencies of type 'scal' to other Representations, those Representations are also marked as candidate Representations.
- from the base track, the client device identifies dependent representations and downloads the corresponding segments with respect to the following rule:
  - if the dependencyType attribute value is equal to 'scal', downloading the segment of the dependent representations is mandatory;
  - if the dependencyType attribute value is equal to 'tile', downloading the segment of the dependent representations is optional, depending on whether the dependent representation is part of a candidate or not,
- the client device downloads the selected tile and base media segments as explained with reference to FIG. 13 (1408 to 1416); and
- the client device parses the concatenated media segments and resolve extractors that point to non-void data (i.e. selected tile(s)).

It is to be noted that instead of defining a new reference type equal to 'tile', an alternative embodiment consists in combining the dependency type with the codec attribute of the dependent Representation. There is: "if dependencyType='scal' and @codec='hvt1'", then it is optional to download except if it is part of candidate Representations.

According to a third embodiment, a composite or reference track is presented twice for two different purposes, the first purpose being directed to the use of the composite or reference track as an entry point (i.e. a selectable representation) and the second purpose being to express dependencies (they represent "ghost" or "virtual" representations).

To avoid any dependency cycles being resolved (i.e. when a tile track representation depends on a reference track representation (dependencyType='tbas') and when a reference track representation depends on tile track representation (dependencyType='scal' or 'tile')), as described below, two virtual representations for the same reference track are defined in the MPD. In this way a dependency cycle can be broken in MPD without having to create a new attribute.

Figure 11:
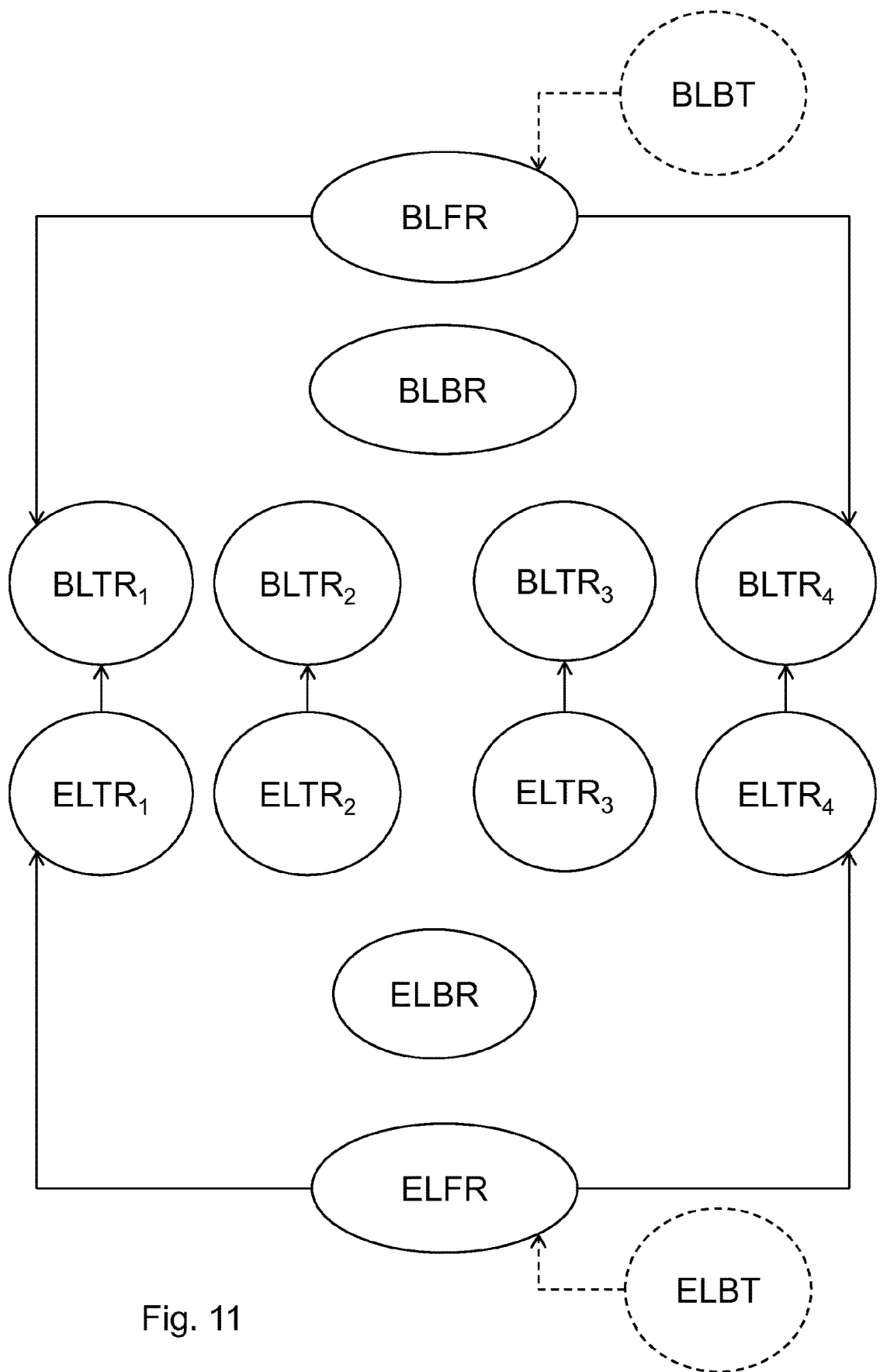
FIG. 11 illustrates an example of dependencies to be solved in a tiling configuration.

FIG. 11 illustrates an example of dependencies to be solved in a tiling configuration, to illustrate the implementation of the invention according to the third embodiment. According to the given example, dashed lines represent tracks defined in the file format and plain lines represent representations defined in the MPD.

According to the illustrated example and by considering all the tracks defined for the base layer in the file format (i.e. the base layer base track or reference track (BLBT) and the base layer tile tracks (BLTT1+BLTT2+BLTT3+BLTT4), represented with dashed lines), the following representations are created when creating the MPD:

- the BLFR (Base Layer Full Resolution representation) that depends on all tile representations needed to reconstitute the full resolution (dependencyId="BLTR1 . . . BLTR4");
- the BLBR (Base Layer Base Representation) with the same list of media segments as for the BLFR but with no dependencies. As this representation is not playable because it contains only partial data without any dependencies on other representations, it is marked as not playable by setting width and height parameter to NULL; and
- BLTR1 to BLTR4 (Base layer Tile Representation) representing the tile tracks, all having a dependency on the BLBR.

As an alternative embodiment, this Representation is signalled as being not playable by defining a new specific attribute or flag in Representation or by defining specific descriptor associated to Representation (for instance based on EssentialProperty so if the client does not understand the "not playable" property it would remove this representation from the MPD).

Accordingly, if the client device wants to play the full resolution, it can select the BLFR representation and resolves its dependencies as defined by DASH to download all necessary media segments (base track and all associated tile tracks).

Likewise, if the client device wants to play only some tiles, it can select the corresponding tile representations (BLTRi) and resolves their dependencies on the BLBR as defined by DASH with a slight additional detail: if several tiles are downloaded, the BLBR would be downloaded only once.

The description of these representations can be expressed as follows:

```
<AdaptationSet>
  <Role
    schemeIdUri=" urn:mpeg:dash:role:2011"
    value="supplementary"/>
  <EssentialProperty
    schemeIdUri=" urn:mpeg:dash:srd:2014"
    value="0 0 0 0"/>
  <Representation id="BLBR" w=h=0...>
  </Representation>
  <Representation id="ELBR" w=h=0...>
```

```
  </Representation>
</AdaptationSet>
<AdaptationSet>
  <Role
    schemeIdUri=" urn:mpeg:dash:role:2011"
    value="main"/>
  <SupplementalProperty
    schemeIdUri=" urn:mpeg:dash:srd:2014"
    value="0 0 W H"/>
  <Representation id="BLFR"
    dependencyId="BLTR1 ... BLTR4" ...>
  </Representation>
  <Representation id="ELFR"
    dependencyId="ELTR1 ... ELTR4" ...>
  </Representation>
</AdaptationSet>
<AdaptationSet>
  <Role
    schemeIdUri=" urn:mpeg:dash:role:2011"
    value="alternate"/>
  <SupplementalProperty
    schemeIdUri=" urn:mpeg:dash:srd:2014"
    value="0 0 W/2 H/2"/>
  <Representation id="BLTR1"
    dependencyId="BLBR"...>
  </Representation>
  <Representation id="ELTR1"
    dependencyId="BLTR1 ELBR"...>
  </Representation>
</AdaptationSet>
...
<AdaptationSet>
  <Role
    schemeIdUri=" urn:mpeg:dash:role:2011"
    value="alternate"/>
  <SupplementalProperty
    schemeIdUri=" urn:mpeg:dash:srd:2014"
    value="W/2 H/2 W/2 H/2"/>
  <Representation id="BLTR4"
    dependencyId="BLBR"...>
  </Representation>
  <Representation id="ELTR4"
    dependencyId="BLTR1 ELBR"...>
  </Representation>
</AdaptationSet>
```

According to this embodiment, the DASH dependencies are in the extractor order. Regarding the separation between tracks and representations, some representations are duplicated to point to the same tracks but with different dependencies (e.g. BLBR~BLTR or ELBR~ELTR). It adds virtual representations only for total tracks, if necessary for backward compatible default playback, and it relies on a smart client device not downloading the same resources twice.

Figure 15:
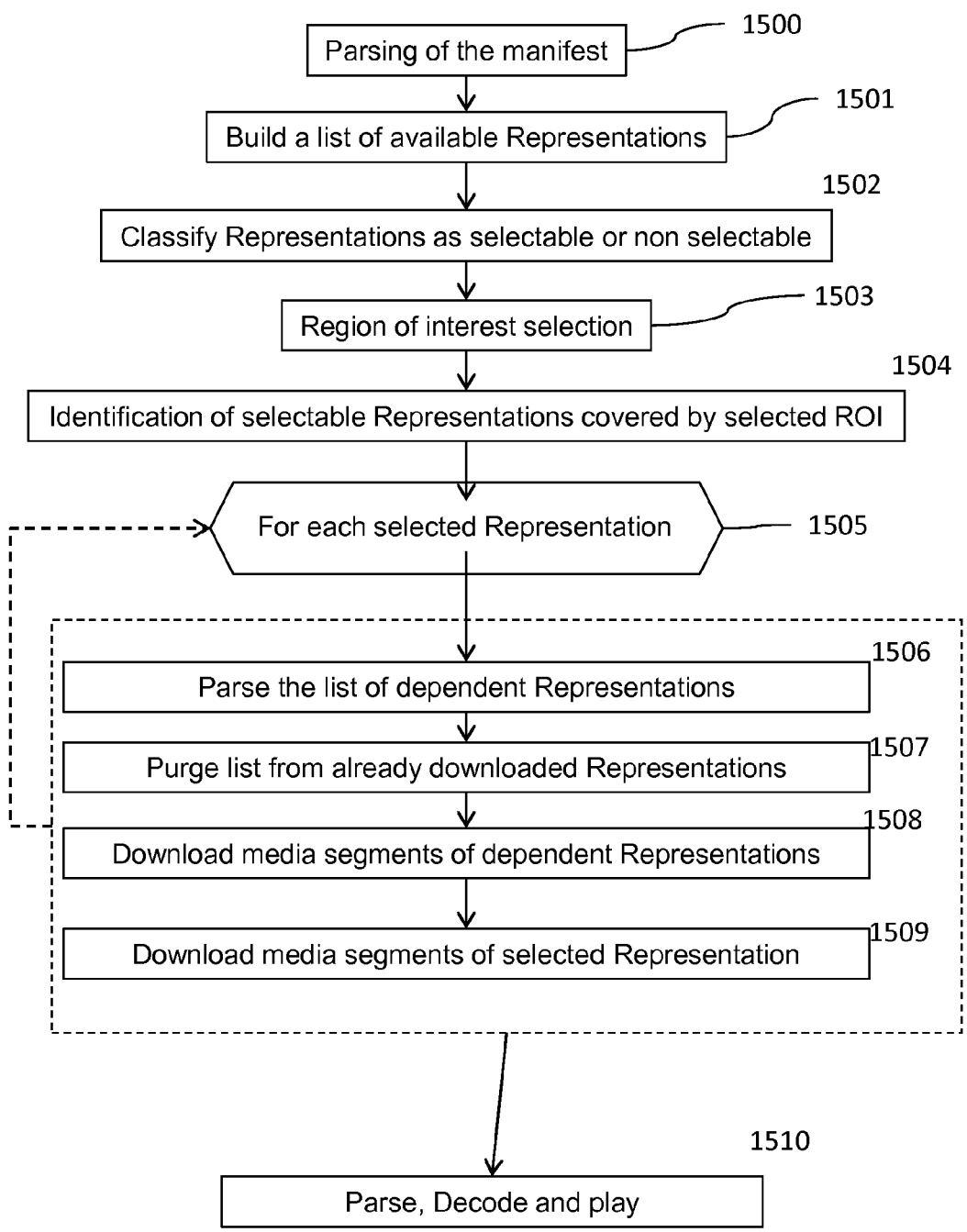

The following description is made with reference to FIG. 15. The behavior of the client device can be summarized as follows:

- the client device parses 1500 the manifest and
    - builds a list of representations 1501 that potentially contains representations at different scalability layers and for different spatial tiles; and
    - classifies representations 1502 as selectable or non-selectable ("ghost", non-displayable);
        - for example: representation@w, h=0, SRD@w,h=0, specific attribute in representation, or specific descriptor associated with representation;
- the user selects a spatial area on a video 1503,
    - the client device identifies 1504 candidate representations using SRD annotations;
    - the client device, for each selected representation, follows dependencies, includes dependent representations as candidate 1506;

the client device purges the list of redundant dependent representations by keeping only the first instance 1507;

the client device downloads the selected tile and base media segments for candidate representations 1508, 1509; and the client device parses the concatenated media segments and resolves extractors that point to non-void data (i.e. selected tile(s)) 1510.

For instance, if the client wants to play the tile corresponding to the Representation ELTR1, then the @dependencyId attribute signals that this Representation depends on Representations BLTR1 and ELBR. First, the first dependency to BLTR1 (tile 1 from the base layer) is solved. It appears that BLTR1 also depends on the tile base track BLBR. And BLBR does not have any dependencies so we solve all dependencies for BLTR1. Then the client checks the dependencies to ELBR. It also does not have any dependencies. At that time all dependencies have been solved and we obtain the following list of dependencies to access ELTR1: BLBR BLTR1 ELBR ELTR1.

As another example, if the client wants to access to the full resolution of the enhancement layer, it can either select the Representation ELFR and follow all dependencies: ELFR depends on BLFR and ELTR1 to ELTR4, and BLFR depends on BLTR1 to BLTR4. Thus the list of dependencies is: BLTR1 BLTR2 BLTR3 BLTR4 BLFR ELTR1 ELTR2 ELTR3 ELTR4 ELFR.

Figure 12:
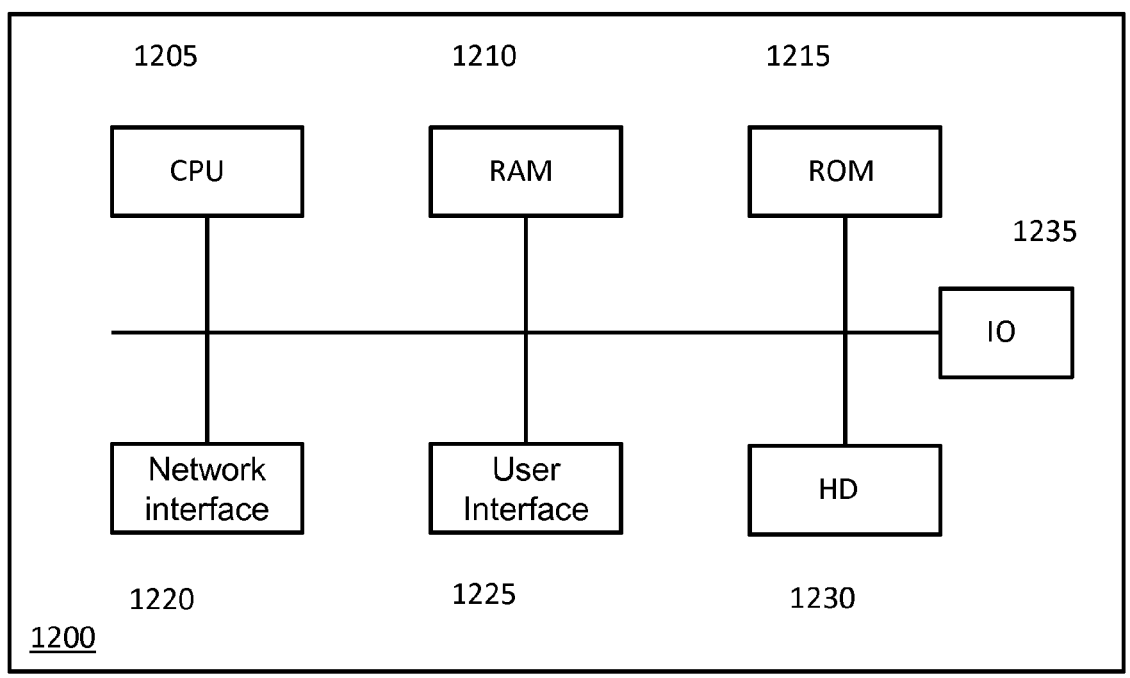
FIG. 12 is a schematic block diagram of a computing device that can be used for carrying out each of or some steps of each of the described embodiments of the invention.

FIG. 12 is a schematic block diagram of a computing device 1200 that can be used for carrying each or some steps of each of the described embodiments of the invention. Computing device 1200 may be a device such as a microcomputer, a workstation, or a light portable device.

Computing device 1200 comprises a communication bus connected to:

- a central processing unit 1205, such as a microprocessor, denoted CPU;
- a random access memory 1210, denoted RAM, for storing the executable code of the method of embodiments of the invention as well as registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
- a read only memory 1215, denoted ROM, for storing computer programs for implementing embodiments of the invention;
- a network interface 1220 is typically connected to a communication network over which digital data to be processed are transmitted or received. The network interface 1220 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1205;
- a user interface 1225 for receiving inputs from a user or to display information to a user;
- a hard-disk 1230 denoted HD; and
- an I/O module 1235 for receiving/sending data from/to external devices such as a video source or display.

The executable code may be stored either in read only memory 1215, on the hard-disk 1230, or on a removable digital medium such as for example a disk. According to a variant, the executable code of the programs can be received by means of a communication network, via the network interface 1220, in order to be stored in one of the storage means of the communication device 1200, such as the hard disk 1230, before being executed.

The central processing unit 1205 is adapted to control and direct the execution of the instructions or portions of software code of the program or programs according to embodiments of the invention, which instructions are stored in one of the aforementioned storage means. After powering on, the CPU 1205 is capable of executing instructions from main RAM memory 1210 relating to a software application after those instructions have been loaded from the program ROM 1215 or the hard-disc 1230 for example. Such a software application, when executed by the CPU 1205, causes steps of the algorithms described previously to be performed.

In this embodiment, the apparatus is a programmable apparatus which uses software to implement the invention. However, alternatively, embodiments of the present invention may be implemented in hardware (for example, in the form of an Application Specific Integrated Circuit or ASIC).

Embodiments of the invention may be embedded in a device such as a camera, a smartphone, or a tablet that acts as a remote controller for a TV, for example to zoom into a particular region of interest. They can also be used from the same devices to have personalized browsing experience of a TV program by selecting specific areas of interest. Another usage of these devices by a user is to share selected sub-parts of his/her preferred videos with other connected devices. They can also be used in a smartphone or tablet to monitor what happens in a specific area of a building placed under surveillance provided that the surveillance camera supports the generation part of this invention.

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

APPENDIX

```
<?xml version="1.0" encoding="UTF-8"?>
<MPD
  xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011
  DASH-MPD.xsd"
  type="static"
  mediaPresentationDuration="PT3256S"
  minBufferTime="PT1.2S"
  profiles="urn:mpeg:dash:profile:isoff-on-demand:2011">
  <BaseURL>http://cdn1.example.com/</BaseURL>
  <BaseURL>http://cdn2.example.com/</BaseURL>
  <!-- In this Period the multimedia presentation is composed of two media
  content component types: one audio and one video -->
  <Period>
    <!--English audio -->
    <AdaptationSet
      mimeType="audio/mp4"
      codecs="mp4a.0x40"
      subsegmentAlignment="true"
```

APPENDIX-continued

```
      subsegmentStartsWithSAP="1"
        lang="en">
      <Representation
        id="audio1"
        bandwidth="64000">
        <BaseURL>audio-64k.mp4</BaseURL>
      </Representation>
      <Representation
        id="audio2"
        bandwidth="32000">
        <BaseURL>audio-32k.mp4</BaseURL>
      </Representation>
    </AdaptationSet>
    <!-- In this Adaptation Set, the scalable SVC is split into
three representations -->
    <AdaptationSet
      subsegmentAlignment="true"
      subsegmentStartsWithSAP="2"
      minBandwidth="512000"
      maxBandwidth="1024000"
      frameRate="30">
      <!-- Independent Representation -->
      <Representation
        mimeType="video/mp4"
        codecs="avc1.4D401E"
        id="tag5"
        width="320"
        height="240"
        bandwidth="512000">
        <BaseURL>video-512k.mp4</BaseURL>
        <SegmentBase indexRange="0-4332"/>
      </Representation>
      <!-- Representation dependent on above -->
      <Representation
        mimeType="video/mp4"
        codecs="avc2.56401E"
        id="tag6"
        width="640"
        height="480"
        dependencyId="tag5"
        bandwidth="768000">
        <BaseURL>video-768k.mp4</BaseURL>
        <SegmentBase indexRange="0-3752"/>
      </Representation>
      <!-- Representation dependent on both above -->
      <Representation
        mimeType="video/mp4"
        codecs="avc2.56401E "
        id="tag7"
        dependencyId="tag5 tag6"
        width="1280"
        height="720"
        bandwidth="1024000">
        <BaseURL>video-1024k.mp4</BaseURL>
        <SegmentBase indexRange="0-3752"/>
      </Representation>
    </AdaptationSet>
  </Period>
</MPD>
```

Extract of code 1: Manifest File

The invention claimed is:

1. A method for transmitting Media Presentation Description, MPD, for a client to obtain media data, the method comprising:
(i) generating data for identifying a plurality of Representations as defined in MPEG-DASH standard, describing a plurality of tracks based on the media data,
(ii) generating data for identifying among the plurality of Representations, a Representation that is associated with at least another Representation, and
(iii) determining a track reference type characterizing a type of association between the associated Representation and the at least another Representation, the track reference type being encoded as a four characters code, generating the MPD including the generated data and the determined track reference type;
transmitting the MPD to the client in response to receipt of a request from the client,
wherein the generated data for identifying a Representation that is associated with at least another Representation is a reference to the at least another Representation.

2. The method according to claim 1, wherein the associated Representation describes a metadata track and the another Representation describes a video track, and wherein the reference type indicated by the track reference type is 'cdsc'.

3. The method according to claim 2, wherein the other Representation describing a video track contains a spatial relationship descriptor.

4. The method according to claim 1, wherein the associated Representation and the at least another Representation belong to two different Adaptation Sets.

5. The method according to claim 1, wherein the reference to the at least another Representation is an identifier for identifying the at least another Representation.

6. A method for transmitting descriptive data for a client to obtain media data, the method comprising:
generating a Media Presentation Description, MPD, including both of
(i) descriptive information for identifying a Representation that is associated with another Representation, wherein the Representations describe a plurality of tracks based on the media, and
(ii) a track reference type characterizing a type of association between the associated Representation and the another Representation, the track reference type being encoded as a four characters code, the track reference type being one of a plurality of possible track reference types, and
transmitting the MPD to the client in response to receipt of a request from the client,
wherein the Representations are defined in MPEG-DASH standard,
wherein the descriptive information for identifying a Representation that is associated with another Representation is a reference to the another Representation.

7. The method according to claim 6, wherein the descriptive information further includes another identifier for identifying the associated Representation.

8. The method according to claim 7, wherein the associated Representation describes a metadata track and the another Representation describes a video track, and wherein the reference type indicated by the track reference type is 'cdsc'.

9. The method according to claim 7, wherein the track reference type is complying with the ISOBMFF standard.

10. A device for transmitting descriptive data for a client device for requesting media data, the device comprising:
generating means for generating a Media Presentation Description, MPD, including descriptive information for:
(i) identifying a plurality of Representations as defined in MPEG-DASH standard, describing a plurality of tracks based on the media data,
(ii) identifying among the plurality of Representations, a Representation that is associated with at least another Representation, and
(iii) providing a track reference type characterizing a type of association between the associated Representation and the at least another Representation, the track reference type being encoded as a four characters code, the track reference type being one of a plurality of possible track reference types, and transmitting means for transmitting the MPD to the client device in response to receive a request from the client device, wherein the descriptive information for identifying a Representation that is associated with at least another Representation is a reference to the at least another Representation.

11. The device according to claim 10, wherein the associated Representation describes a metadata track and the another Representation describes a video track, and wherein the reference type indicated by the track reference is 'cdsc'.

12. The device according to claim 11, wherein the another Representation describing a video track contains a spatial relationship descriptor.

13. A device for transmitting descriptive data for a client device to request media data, the device comprising:
generating means for generating a Media Presentation Description, MPD, including both of (i) descriptive information for identifying a Representation that is associated with another Representation, wherein the Representations describe a plurality of tracks based on the media data, and (ii) a track reference type characterizing a type of association between the associated Representation and the another Representation, the track reference type being encoded as a four characters code, the track reference type being one of a plurality of possible track reference types, and
transmitting means for transmitting the MPD to the client device in response to receipt of a request from the client device,
wherein the Representations are defined in MPEG-DASH standard,
wherein the descriptive information for identifying a Representation that is associated with another Representation is a reference to the another Representation.

14. The device according to claim 13, wherein the associated Representation describes a metadata track and the another Representation describes a video track, and wherein the reference type indicated by the track reference type is 'cdsc'.

15. The device according to claim 13, wherein the track reference type is complying with the ISOBMFF standard.

16. A method for requesting media data, the method comprising:
receiving a Media Presentation Description, MPD, including descriptive information for:
(i) identifying a plurality of Representations as defined in MPEG-DASH standard, describing a plurality of tracks based on the media data,
(ii) identifying among the plurality of Representations, a Representation that is associated with at least another Representation, and
(iii) providing a track reference type information characterizing a type of association between the associated Representation and the at least another Representation, the track reference type being encoded as a four characters code, the track reference type being one of a plurality of possible track reference types, and
determining media data to be requested based on the associated Representation, the another Representation and the track reference type, and
requesting the determined media segments, wherein the descriptive information for identifying a Representation that is associated with at least another Representation is a reference to the at least another Representation.

17. The method according to claim 16, wherein the associated Representation describes a metadata track and the another Representation describes a video track, and wherein the reference type indicated by the track reference type is 'cdsc'.

18. A method for requesting media data, the method comprising:
receiving a Media Presentation Description, MPD, including both of (i) descriptive information for identifying a Representation that is associated with another Representation, wherein the Representations describe a plurality of tracks based on the media data, and (ii) a track reference type characterizing a type of association between the associated Representation and the another Representation, the track reference type being encoded as a four characters code, the track reference type being one of a plurality of possible track reference types;
determining media data to be requested based on the associated Representation, the another Representation and the track reference type; and
requesting the determined media data,
wherein the Representations are defined in MPEG-DASH standard,
wherein the descriptive information for identifying a Representation that is associated with another Representation is a reference to the another Representation.

19. The method according to claim 18, wherein the associated Representation describes a metadata track, the another Representation describes a video track, and wherein the reference type indicated by the track reference type is 'cdsc'.

20. The method according to claim 18, wherein the track reference type is complying with the ISOBMFF standard.

21. A device for requesting media data, the device comprising:
receiving means for receiving a Media Presentation Description, MPD, including descriptive information for:
(i) identifying a plurality of Representations as defined in MPEG-DASH standard, describing a plurality of tracks based on the media data,
(ii) identifying among the plurality of Representations, a Representation that is associated with at least another Representation, and
(iii) providing a track reference type characterizing a type of association between the associated Representation and the at least another Representation, the track reference type being encoded as a four characters code, the track reference type being one of a plurality of possible track reference types, and
determining means for determining media data to be requested based on the associated Representation, the at least another Representation and the track reference type, and
requesting means for requesting to a server device the determined media,
wherein the descriptive information for identifying a Representation that is associated with at least another Representation is a reference to the at least another Representation.

22. The device according to claim 21, wherein the associated Representation describes a metadata track and the at least another Representation describes a video track, and wherein the reference type indicated by the track reference type is 'cdsc'.

23. A device for requesting media data, the device comprising:
receiving means for receiving a Media Presentation Description, MPD, including both of (i) descriptive information for identifying a Representation that is associated with another Representation, wherein the Representations describe a plurality of tracks based on the media data, and (ii) track reference type characterizing a type of association between the associated Representation and the another Representation, the track reference type being encoded as a four characters code, the track reference type being one of a plurality of possible track reference types, and;
determining means for determining media data to be requested based on the associated Representation, the another Representation and the track reference type, and
requesting means for requesting to a server device the determined media data, wherein the Representations are defined in MPEG-DASH standard,
wherein the descriptive information for identifying a Representation that is associated with at least another Representation is a reference to the at least another Representation.

24. The device according to claim 23, wherein the associated Representation describes a metadata track, the another Representation describes a video track, and wherein the reference type indicated by the track reference type is 'cdsc'.

25. The method according to claim 23, wherein the track reference type is complying with the ISOBMFF standard.

26. A device for transmitting a Media Presentation Description, MPD, for a client to obtain media data, the device comprising a processor configured for:

(i) generating data for identifying a plurality of Representations as defined in MPEG-DASH standard, describing a plurality of tracks based on the media data,
(ii) generating data for identifying among the plurality of Representations, a Representation that is associated with at least another Representation, and
(iii) determining a track reference type characterizing a type of association between the associated Representation and the at least another Representation, the track reference type being encoded as a four characters code,
generating the MPD including the generated data and the determined track reference type;
transmitting the MPD to the client in response to receipt of a request from the client,
wherein the generated data for identifying a Representation that is associated with at least another Representation is a reference to the at least another Representation.

27. The device according to claim 26, wherein the associated Representation describes a metadata track and the another Representation another Representation describes a video track, and wherein the reference type indicated by the track reference type is 'cdsc'.

28. The device according to claim 27, wherein the other Representation describing a video track contains a spatial relationship descriptor.

29. The device according to claim 26, wherein the associated Representation and the at least another Representation belong to two different Adaptation Sets.

30. The device according to claim 26, wherein the reference to the at least another Representation is an identifier for identifying the at least another Representation.

31. The device according to claim 26, wherein the descriptive information further includes another identifier for identifying the associated Representation.

* * * * *